US012808131B2

(12) United States Patent
Brenny et al.

(10) Patent No.: US 12,808,131 B2
(45) Date of Patent: Nov. 24, 2026

(54) VISION-BASED RAILWAY COMPONENT CHARACTERIZATION AND METHOD

(71) Applicant: Racine Railroad Products, Inc., Mt. Pleasant, WI (US)

(72) Inventors: Christopher D. Brenny, Burlington, WI (US); Jeff S. Hon, Rochester, WI (US); Mark S. Osmak, St. Francis, WI (US); Pawel J. Pekala, Gurnee, IL (US); Daniel M. Sojka, Pleasant Prairie, WI (US); Kyle Gherke, Sun Prairie, WI (US)

(73) Assignee: Racine Railroad Products, Inc., Mt. Pleasant, WI (US)

( * ) Notice: Subject to any disclaimer, the term of this patent is extended or adjusted under 35 U.S.C. 154(b) by 491 days.

(21) Appl. No.: 18/236,183

(22) Filed: Aug. 21, 2023

(65) Prior Publication Data

US 2024/0060245 A1 Feb. 22, 2024

Related U.S. Application Data

(60) Provisional application No. 63/399,835, filed on Aug. 22, 2022.

(51) Int. Cl.
*E01B 37/00* (2006.01)
*B61K 9/08* (2006.01)
(Continued)

(52) U.S. Cl.
CPC ................ *E01B 37/00* (2013.01); *B61K 9/08* (2013.01); *G06V 10/751* (2022.01); *G06V 20/56* (2022.01)

(58) Field of Classification Search
CPC ............ E01B 31/26; E01B 37/00; B61K 9/08
See application file for complete search history.

(56) References Cited

U.S. PATENT DOCUMENTS 3,144,835 A * 8/1964 Pehoski .................. E01B 31/26 238/370
3,372,651 A * 3/1968 Plasser .................... E01B 27/16 104/12

(Continued)

FOREIGN PATENT DOCUMENTS

FR 3006276 A1 * 12/2014 ............ E02F 3/8825
WO WO-2012103859 A1 * 8/2012 ........... E01B 27/107
WO 2022087506 10/2021

*Primary Examiner* — S. Joseph Morano
*Assistant Examiner* — Maxwell L Meshaka
(74) *Attorney, Agent, or Firm* — Boyle Fredrickson, S.C.

(57) ABSTRACT

A railroad tie maintenance machine is configured to detect and seal spike holes in a railroad tie formed by the removal of railroad spikes. The vehicle includes a mothership vehicle and a shuttle cart that are connected by a tether. The shuttle cart is movable relative to the mothership vehicle. The shuttle cart includes a filler workhead having an imaging device, a light source, and an injection wand assembly. The imaging device is configured to take photographs or video beneath the shuttle cart while it travels along the railway. Using a computer vision system, the location of the ties and the spike holes in the ties are identified, after which the injection wand assembly is moved in lateral and longitudinal direction to overlie a spike hole. Thereafter, the injector can be inserted into the spike hole, after which a chemical solution is used to fill the spike holes.

19 Claims, 22 Drawing Sheets

(51) Int. Cl.
*G06V 10/75* (2022.01)
*G06V 20/56* (2022.01)

(56) References Cited

U.S. PATENT DOCUMENTS

| | | | | |
|---|---|---|---|---|
| 6,598,537 | B2 * | 7/2003 | DeLucia | E01B 31/26 104/2 |
| 8,958,079 | B2 | 2/2015 | Kainer et al. | |
| 9,050,984 | B2 | 6/2015 | Li et al. | |
| 9,051,695 | B2 | 6/2015 | Landes et al. | |
| 9,441,956 | B2 | 9/2016 | Kainer et al. | |
| 9,617,692 | B2 | 4/2017 | Brenny et al. | |
| 9,920,488 | B2 | 3/2018 | Delmonico et al. | |
| 10,011,958 | B2 | 7/2018 | Petersen | |
| 10,040,463 | B2 | 8/2018 | Singh | |
| 10,518,791 | B2 | 12/2019 | Singh | |
| 10,796,192 | B2 | 10/2020 | Fernandez | |
| 10,975,527 | B2 | 4/2021 | Delmonico | |
| 11,001,283 | B2 | 5/2021 | Dick et al. | |
| 11,118,315 | B2 * | 9/2021 | Szynakiewicz | E01B 27/102 |
| 11,255,053 | B2 * | 2/2022 | Vizcaino | E01B 9/06 |
| 11,479,920 | B1 * | 10/2022 | Vizcaino | B05C 5/0279 |
| 11,893,727 | B2 * | 2/2024 | Fernandez | G06V 10/82 |
| 12,448,738 | B2 * | 10/2025 | Szynakiewicz | E01B 2/006 |
| 2003/0094114 | A1 | 5/2003 | DeLucia et al. | |
| 2004/0069179 | A1 | 4/2004 | Weber et al. | |
| 2009/0145324 | A1 | 6/2009 | Delmonico | |
| 2012/0192756 | A1 * | 8/2012 | Miller | B61L 23/048 701/19 |
| 2017/0227470 | A1 | 8/2017 | Cesarano | |
| 2018/0281829 | A1 | 10/2018 | Eutson et al. | |
| 2019/0136462 | A1 | 5/2019 | Buerger et al. | |
| 2019/0257036 | A1 * | 8/2019 | Szynakiewicz | E01B 2/006 |
| 2020/0180667 | A1 | 6/2020 | Kim et al. | |
| 2020/0221066 | A1 | 7/2020 | Mesher | |
| 2020/0239049 | A1 | 7/2020 | Dick et al. | |
| 2021/0019548 | A1 | 1/2021 | Fernandez | |
| 2021/0054575 | A1 | 2/2021 | Vizcaino et al. | |
| 2021/0071370 | A1 | 3/2021 | Hamilton et al. | |
| 2021/0229714 | A1 | 7/2021 | Dick et al. | |
| 2021/0363702 | A1 * | 11/2021 | Vizcaino | C09D 5/34 |
| 2021/0372055 | A1 * | 12/2021 | Szynakiewicz | E01B 27/102 |
| 2022/0097746 | A1 * | 3/2022 | Piparsaniya | B61L 15/0018 |
| 2022/0189001 | A1 * | 6/2022 | Fernandez | G06V 10/56 |
| 2022/0325480 | A1 * | 10/2022 | Vizcaino | B27M 3/14 |
| 2024/0060245 | A1 * | 2/2024 | Brenny | E01B 29/26 |
| 2024/0247444 | A1 * | 7/2024 | Brenny | E01B 9/483 |
| 2024/0394865 | A1 * | 11/2024 | Fernandez | G06V 10/56 |

* cited by examiner

VISION-BASED RAILWAY COMPONENT CHARACTERIZATION AND METHOD

CROSS-REFERENCE TO RELATED APPLICATION

The present application claims priority on U.S. Provisional Patent Application Ser. No. 63/399,835, filed Aug. 22, 2022 and entitled Vision-Based Railway Component Characterization System and Method, the entirety of which is hereby incorporated herein by reference.

BACKGROUND OF THE INVENTION

1. Field of the Invention

The present invention relates in general to the field of railroad maintenance. More particularly, the present invention relates to a computer vision-based railway component detector system that detects various components associated with a railway. For instance, the present invention may be used to detect specific components associated with a railway, for instance spike holes, after which a chemical solution can automatically be injected into spike holes of railroad ties during track maintenance. It may also detect the presence of a tie as part of an indexing operation that is a precursor to spike hole filling operation. The present invention could similarly be used to locate ties, tie plates and other features components associated with a railway. The invention also relates to railroad maintenance machines having such a detector system and to a method of using such a system.

2. Discussion of the Related Art

Rail anchors, used to secure a rail to railroad ties, typically are held in place by spikes driven into underlying ties that run perpendicular to the rails. These spikes are removed during a variety of maintenance operations, such as a rail re-lay, anchor or tie plate replacement, etc. As a result of the pulling of the spikes that hold the rails to their plates, several holes remain in the tie at the location vacated by the plate. It is usually desirable to fill or "plug" these "spike holes" to prevent rot and water freezing in the open spike holes, which can cause damage to the tie. In addition, should a spike be inserted into an existing spike hole, something of a substance should be in the location to retain the hold-down force of the spike within the tie.

The classic approach to filling spike holes was simply to manually insert cedar plugs into the holes as part of the rail re-lay operation. These plugs initially were inserted by laborers walking along the railway. Later, machines were developed that allowed operators to insert plugs using hand-held tools.

More recently, several different chemical solutions have been developed that are injected into the holes and then react either with a component of the injected material, chemical, or water to form a relatively hard substance that approximates the physical characteristics of wood. Examples of such solutions include a polyurethane-based chemical, an epoxy-based chemical, and a water-based chemical. The first way of injecting these materials was to manually inject the solution into the spike holes using a caulk gun type device or "gun" that simultaneously mixes the constituent chemicals of the solution and injects the solution into the spike holes. This technique is still in use, but generally is limited to relatively small-scale applications such as replacing a short section of railway.

Vehicles have been developed permitting riding operators to manually inject solution into spike holes using guns of the type historically used by walking operators but supplied with chemicals via one or more on-board tanks rather than a self-contained cartridge on the gun. The machine may be either self-propelled and move along the rails or mounted on the back of a pickup truck or the like. These machines typically include a single gun that is manually directed and activated by an operator. Other than being transported by a vehicle and having tanks, these types of devices are, in essence, the same as the traditional caulk gun style operation.

In all of these machines, the guns are controlled, manipulated and triggered by operator rather than being mounted on a work head and operated automatically. In addition, each of these prior machines or techniques required a dedicated operator to each gun rather than permitting a single operator to operate multiple guns.

A number of the drawbacks experienced with previous systems were largely alleviated with the introduction of the improved spike hole filling machine and method described in U.S. Pat. No. 9,617,692 ("the '692 patent"), which is assigned to the assignee of the present application and which is incorporated herein by reference. This machine permits a riding operator to inject a hole filling solution into spike holes as the machine is propelled along the tracks. The injector is provided on a movable workhead so as to be movable multi-axially by the operator using joysticks and other controls to align the injector with the spike holes and inject solution. This machine represents a dramatic improvement over earlier machines in terms of both accuracy and speed.

Nevertheless, further improvements are desired. Hole location and filling operations are still controlled wholly by an operator in machine described in the '692 patent. This requires a skilled operator on the machine, and still risks operator fatigue and error. It is desirable to detect spike holes and automatically align the machine with the holes, after which the holes are filled using various injection materials.

In addition to detection of spike holes, systems are desired that are capable of detecting other railway features, including but not limited to spikes, anchors, and tie plates. Such systems may also allow for automated removal, replacement, and/or repositioning of these components.

SUMMARY AND OBJECTS OF THE INVENTION

In accordance with an aspect of the invention, a railroad tie maintenance vehicle for identifying and automatically sealing spike holes in a railroad tie includes a machine that moves along a railway having exposed spike holes in railroad ties. The machine includes an imaging device facing downwardly towards the railroad ties, and at least one injection device that is located adjacent to the imaging device and that is movable vertically and horizontally relative to the tie. A controller is coupled to the imaging device and the injection device and is operable, using information received from the imaging device, to identify the existence and locations of spike holes in the ties and to control the injection device to align an injector thereof with the identified spike holes and to dispense a chemical solution into identified spike holes.

The machine may include a spike hole detecting module, and an execution module. The detecting module includes instructions that, when executed, compare an image captured by the imaging device to a database of images of spike holes. The database may be prestored on the machine and/or in an external server, and may be either static or dynamic and updated with newly acquired images during a spike hole filling operation. The execution module includes instructions that, when executed, move the at least one injection device to be inserted into a spike hole and deposit the chemical solution into the spike hole.

In accordance with another aspect, the machine includes controls that drive the at least one injection device to move relative to the railway to position the at least one injection device in a longitudinal and lateral location proximate to the spike holes without operator input. For instance, a plurality of actuators may be provided that move the at least one injection device in longitudinal and lateral directions, as well as vertically, relative to the vehicle.

According to another aspect, the imaging device includes a camera, a hood that overlies the camera, as well as a light that is located adjacent to the camera and that illuminates the area in the field of view of the camera. The injection device is located directly adjacent to the hood, with a fixed lateral distance between the injection device and the imaging device. Thus, the hood is moved in the lateral direction once a spike hole is identified so that the injection device is located at the identified spike hole along the lateral axis. Further, a longitudinal actuator is configured to move the at least one injection device along the longitudinal axis so that the at least one injection device is located at the identified spike hole along the longitudinal axis.

The machine may have a mothership vehicle and a shuttle cart. The mothership vehicle includes a chassis and a plurality of wheels that support the chassis and that are configured to engage at least one rail. The shuttle cart is movably connected to the mothership vehicle by a physical or wireless tether. The shuttle cart also includes a chassis, as well as a propulsion assembly that is configured to propel the shuttle cart towards and away from the mothership vehicle. The injection device and imaging device are mounted on the shuttle cart.

The mothership vehicle may be configured to move at a substantially constant speed along a rail, whereas the shuttle cart travels at a varying speed along the rail relative to the mothership vehicle. More specifically, the shuttle cart frequently indexes to the next tie in the line, where it stops to fill spike holes, after which it moves along the rail to the next located railroad tie.

In accordance with another aspect, a method of operating a railroad tie maintenance machine is provided. The method includes moving the machine along a railway, capturing images of a plurality of railroad ties using an imaging device on the machine, using a controller on the machine to detect and identify at least one spike hole contained in a given railroad tie, under control of the controller, automatically moving an injection device on the machine to overlie the identified spike hole and dispensing a chemical solution into the spike hole. The moving of the machine may include moving a mothership vehicle along the railway and moving a shuttle cart relative to the mothership vehicle, and the shuttle cart supports the imaging device and the injecting device. The moving of the injection device may comprise actuating a plurality of actuators to move the injection device in lateral and longitudinal directions, and then vertically towards and then away from the spike holes. The controller may include or be in communication with one or more databases of images of spike holes, which may be static or may be dynamic and updated during spike hole filling operation. In addition to identifying spike holes, the controller may also be configured to detect other aspects of a railroad tie, such as imperfections in the tie, cracks in the tie, ballast rock or other foreign objects on the tie.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
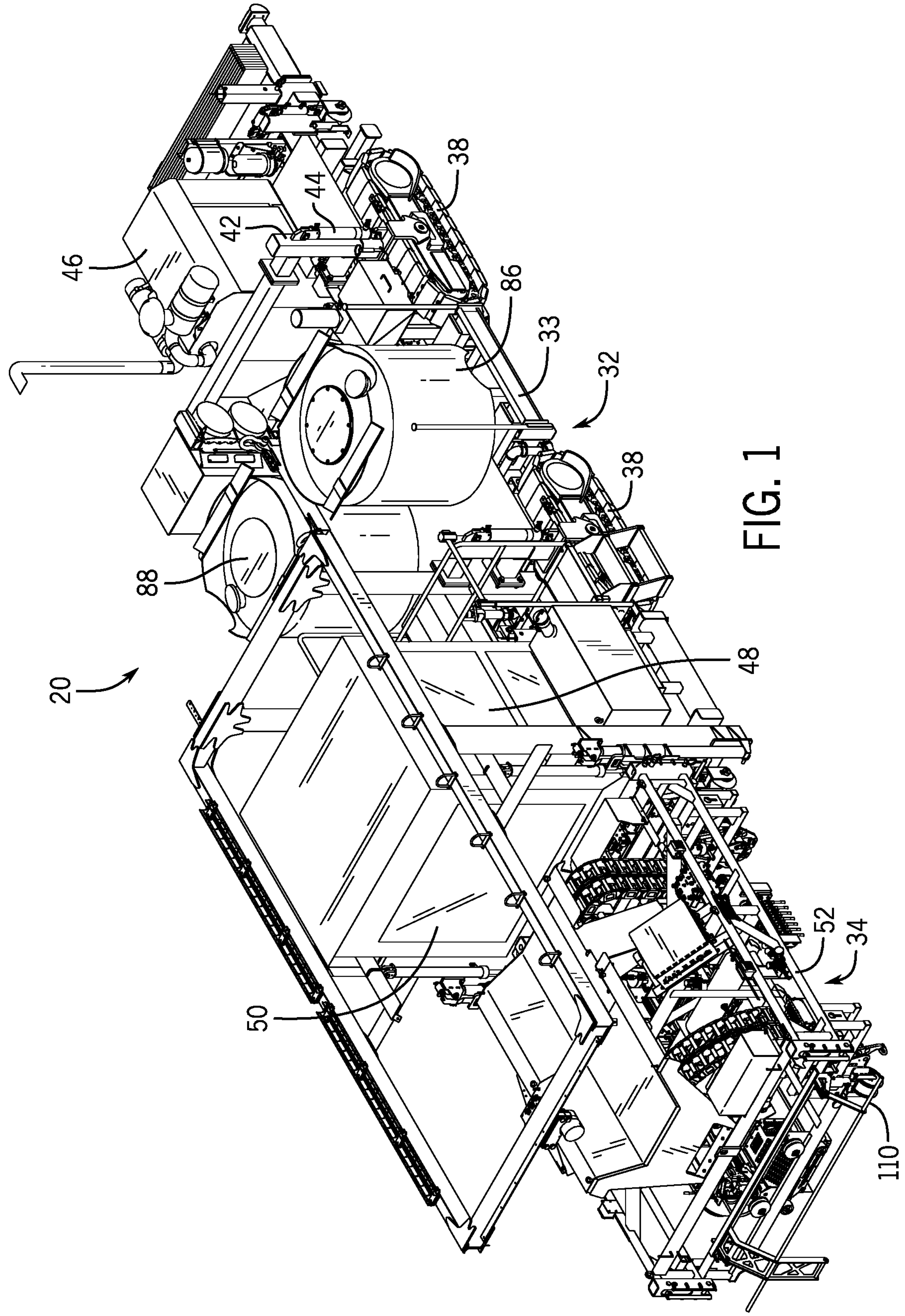
FIG. 1 is a perspective view of a tie filling machine constructed in accordance with an embodiment of the invention.

In describing the preferred embodiment of the invention which is illustrated in the drawings, specific terminology will be resorted to for the sake of clarity. However, it is not intended that the invention be limited to the specific terms so selected, and it is to be understood that each specific term includes all technical equivalents which operate in a similar manner to accomplish a similar purpose. For example, the words "connected", "attached", "supported", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

Referring to the general to the drawings, an automated tie filling machine 20 or vehicle for filling spike holes 22 in railroad ties 24 of a railway 25 is illustrated. Initially, the machine 20 will be described in connection with automated filling of spike holes 22 using a visual detection system that acquires still or video images of the spike holes 22. Additional examples will be provided below in which the visual detection system is used to detect other components associated with a railway.

Figure 10B:
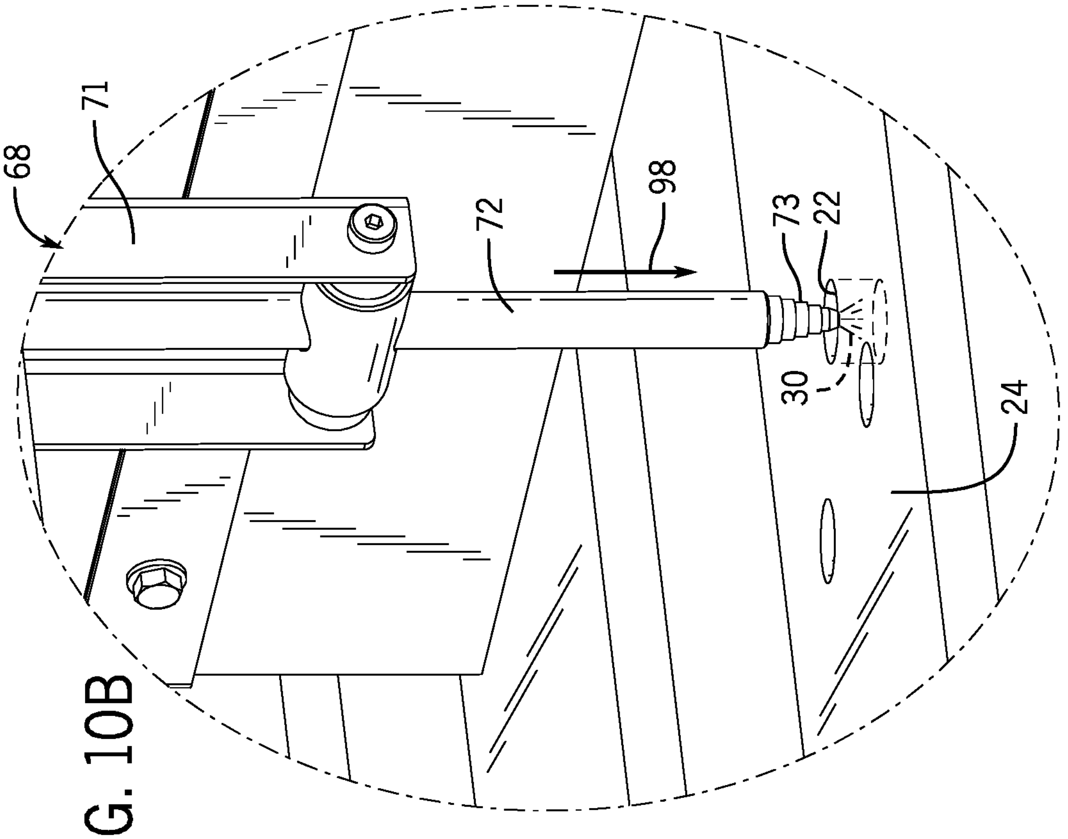
FIG. 10B is a detailed perspective view of the shuttle cart of FIG. 10A in which the injection wand assembly is inserted into one of the plurality of holes formed in the tie and deposits a solution into the hole.
Figure 10A:
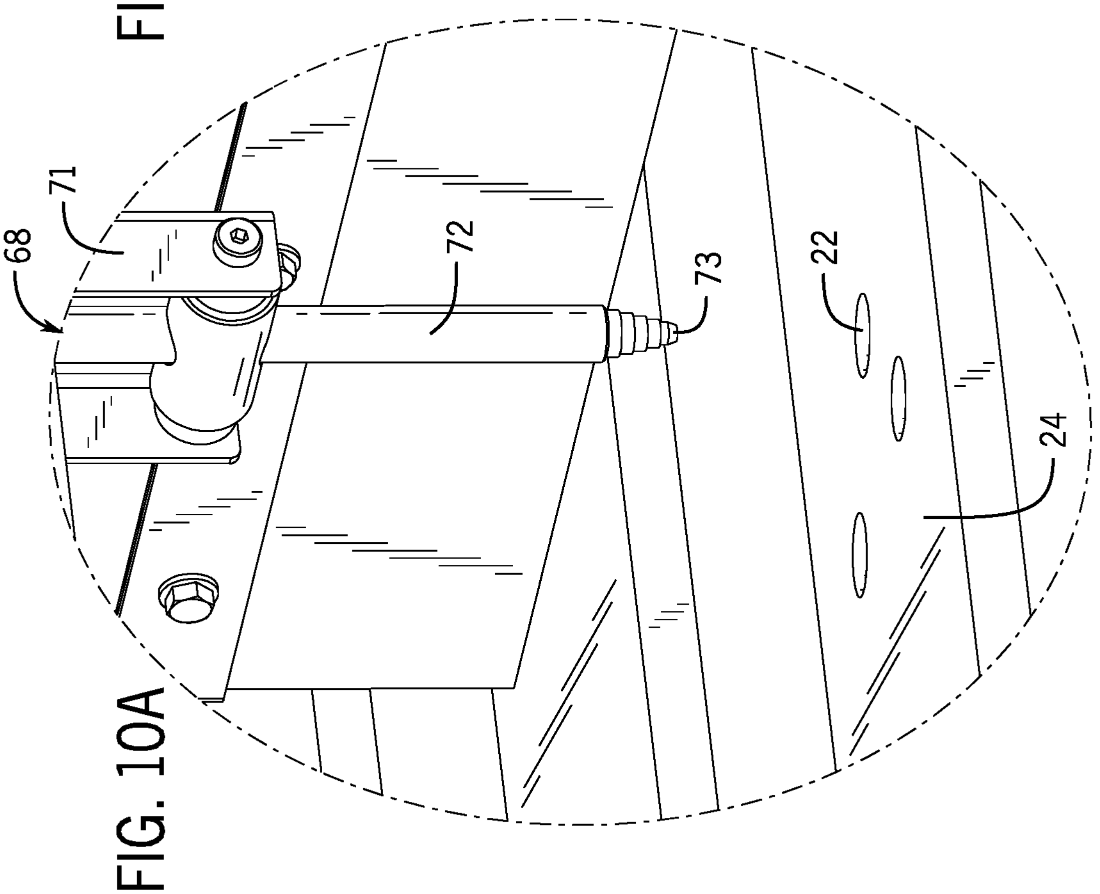
FIG. 10A is a detailed perspective view of the shuttle cart of FIG. 9C taken about line 10A-10A in which the injection wand assembly overlies one of the plurality of holes formed in the tie.
Figure 10D:
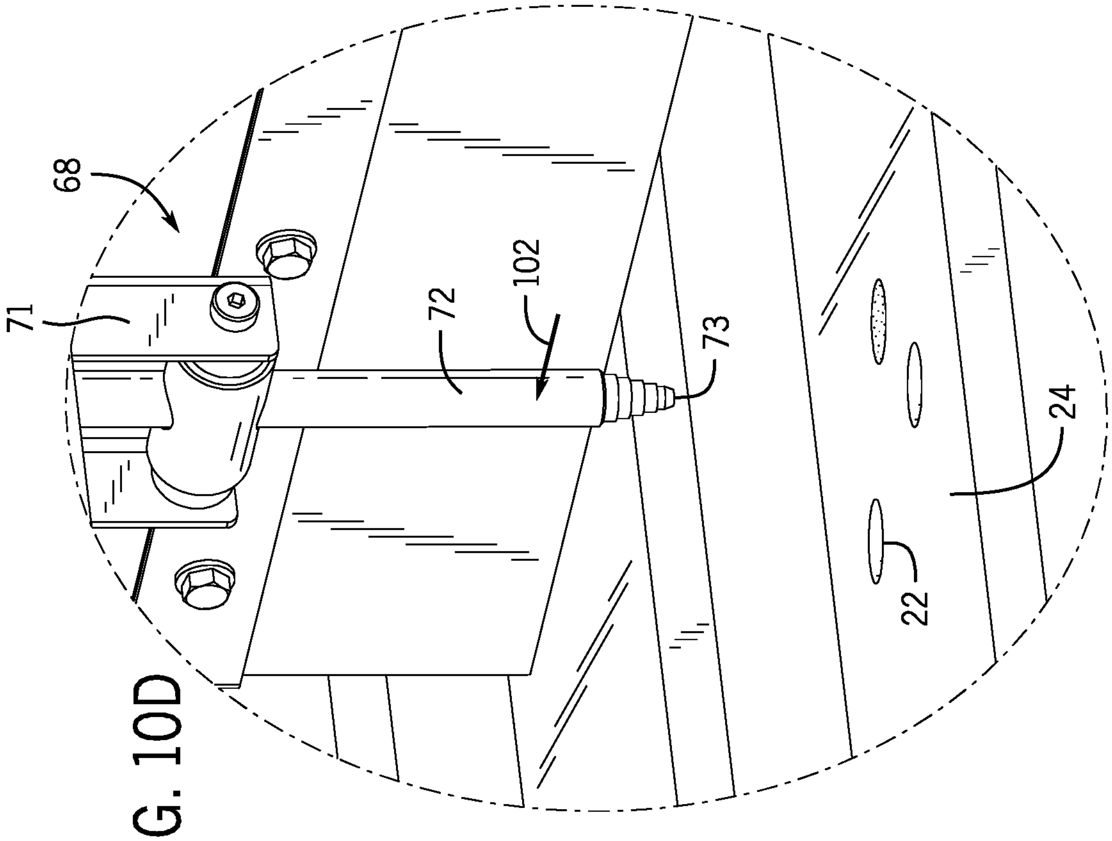
FIG. 10D is a perspective view of the shuttle cart of FIGS. 10A-10C in which the injection wand assembly is moved in the longitudinal direction to align with a second of the plurality of holes formed in the tie along the longitudinal axis.
Figure 10C:
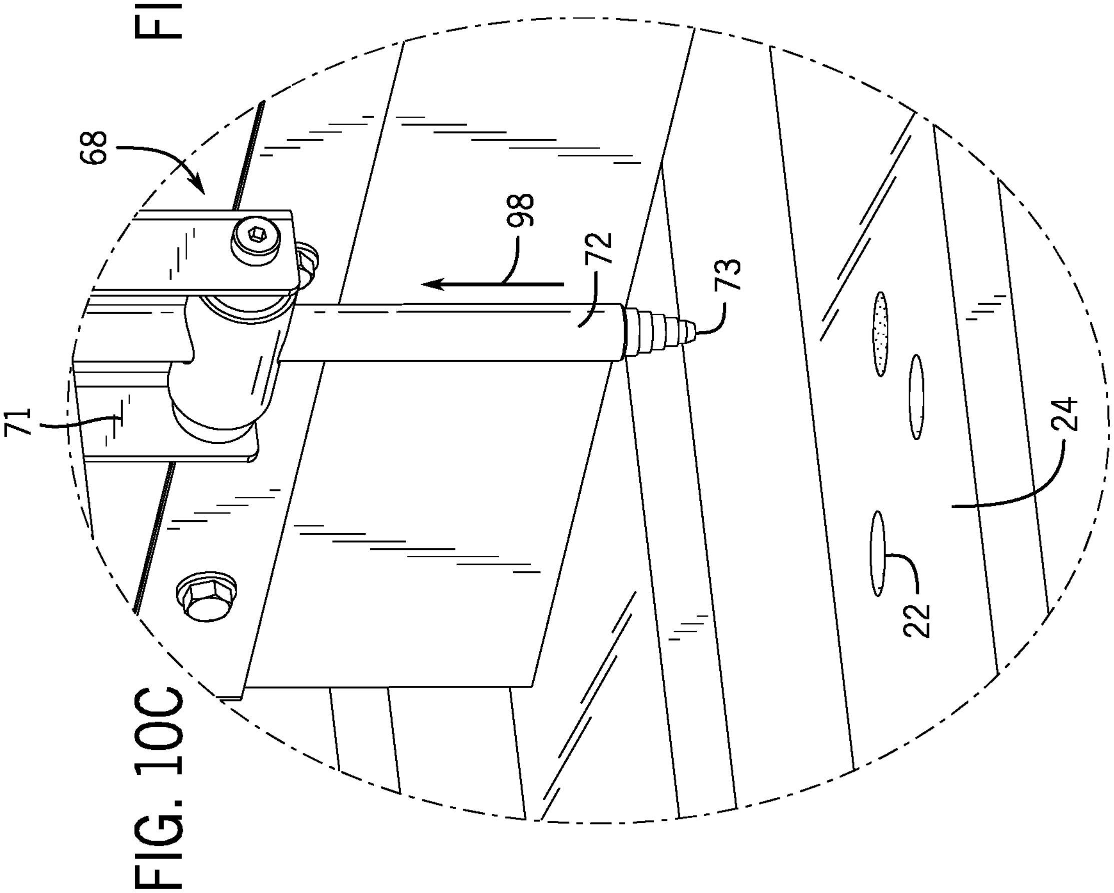
FIG. 10C is a detailed perspective view of the shuttle cart of FIGS. 10A and 10B in which the injection wand assembly is moved upwardly away from the one of the plurality of holes formed in the tie.
Figure 10F:
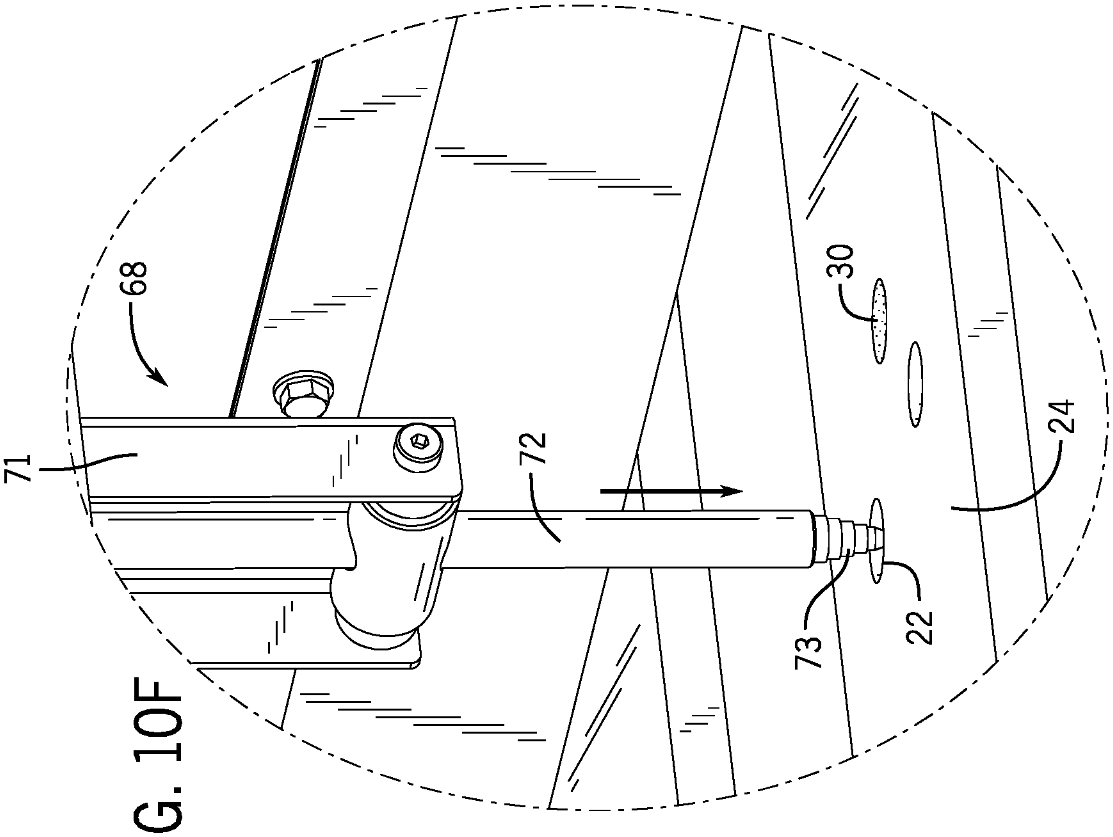
FIG. 10F is a detailed perspective view of the shuttle cart of FIGS. 10A-10E in which the injection wand assembly is inserted into the second of the plurality of holes formed in the tie and deposits a solution into the hole.
Figure 10E:
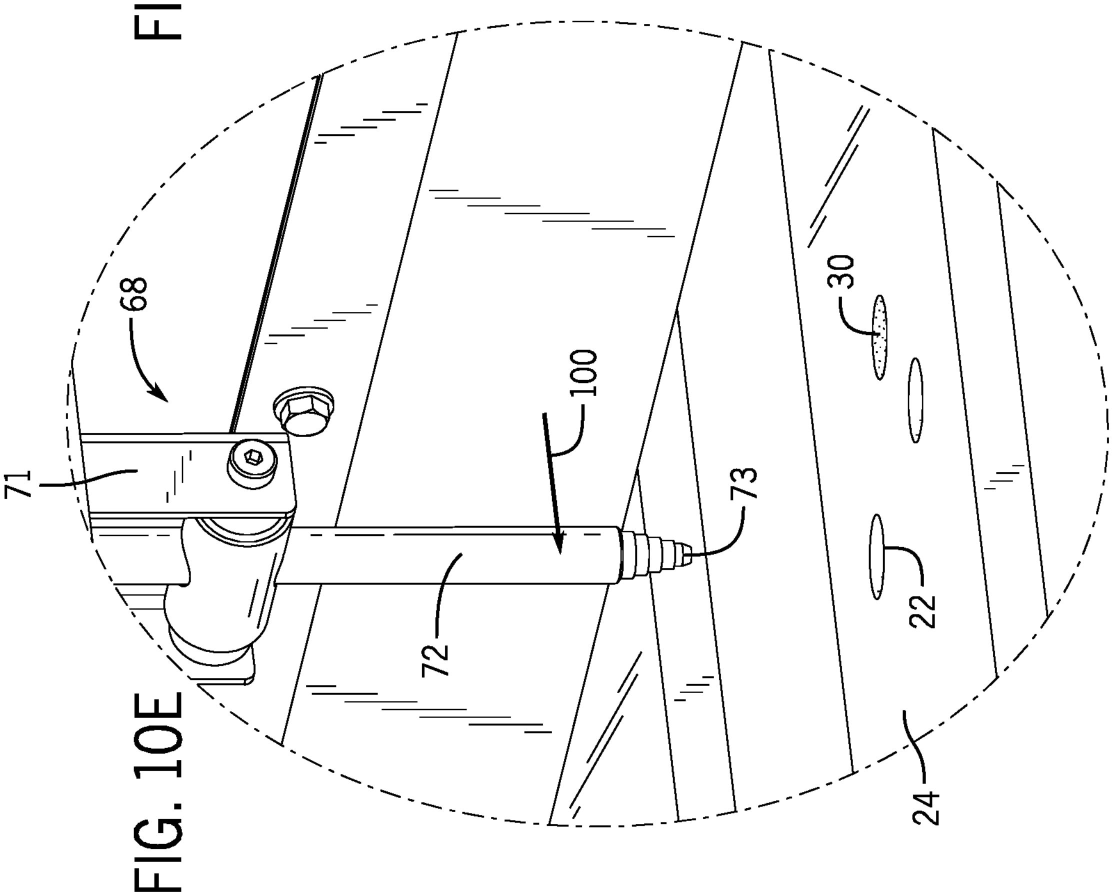
FIG. 10E is a perspective view of the shuttle cart of FIGS. 10A-10D in which the injection wand assembly is moved in a lateral direction to overlie the second of the plurality of holes formed in the tie.

The machine 20 typically will be used as part of a track re-laying operation in which a rail 26 is removed from the railway and replaced with a new rail. As part of this process, the spikes 27 holding the rail 26 to the tie 24 and holding the tie plate 28 to the rail 26 are removed by one or more machines (not shown) working ahead of the tie filling machine 20, leaving holes 22 in the ties 24, and one of the rails (the right rail in the illustrated example) is removed. Those holes 22 should be filled to preserve the integrity of the tie 24 and to provide solid surfaces into which new spikes (not shown) may be driven. Filling typically involves the injection of a chemical solution 30 (FIG. 10B) into the holes 22, the solution 30 being formed from a two-part epoxy, polyurethane, or a water-based system.

Figure 2:
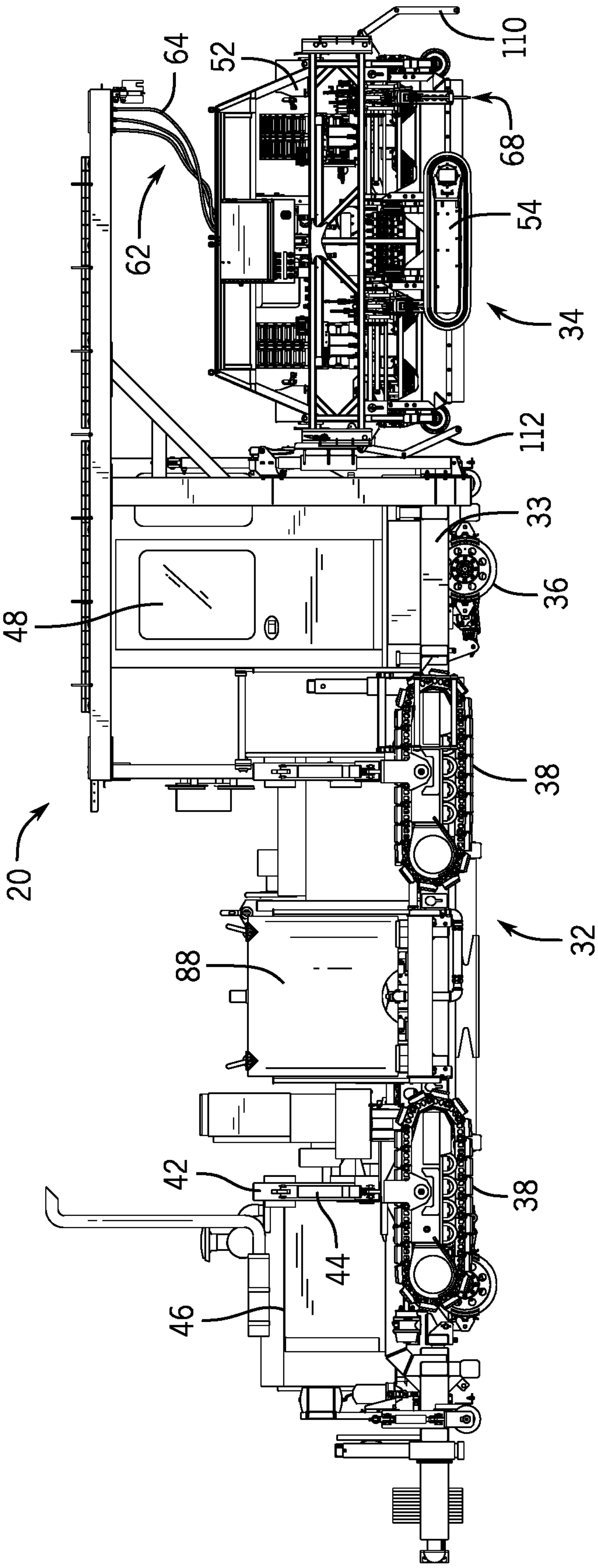
FIG. 2 is a side elevation view of the tie filling machine of FIG. 1 with a shuttle cart located directly adjacent to a mothership vehicle.
Figure 3:
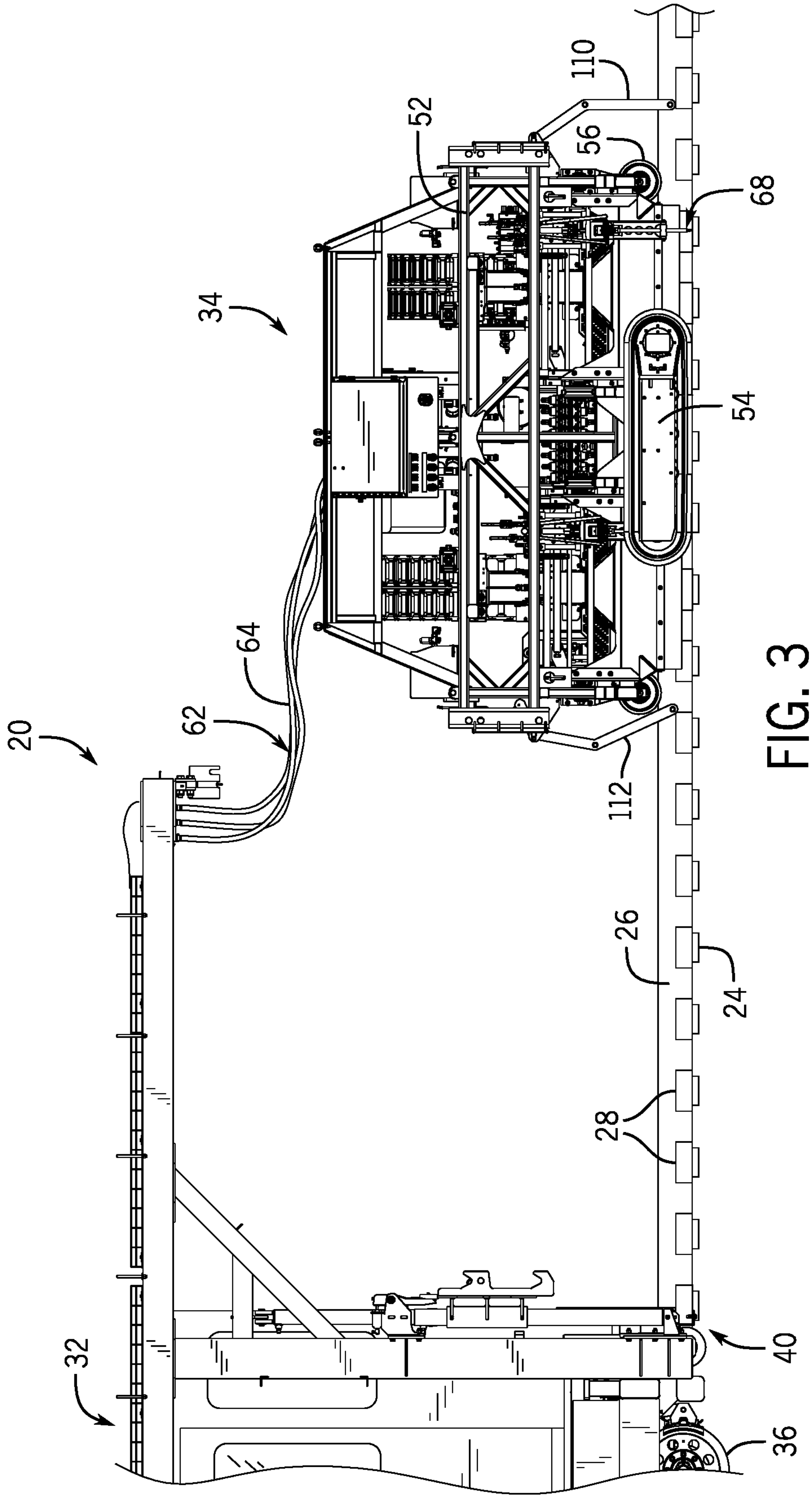
FIG. 3 is a side elevation view of a tie filling machine of FIG. 1, with the shuttle cart distanced from the mothership vehicle.
Figure 4:
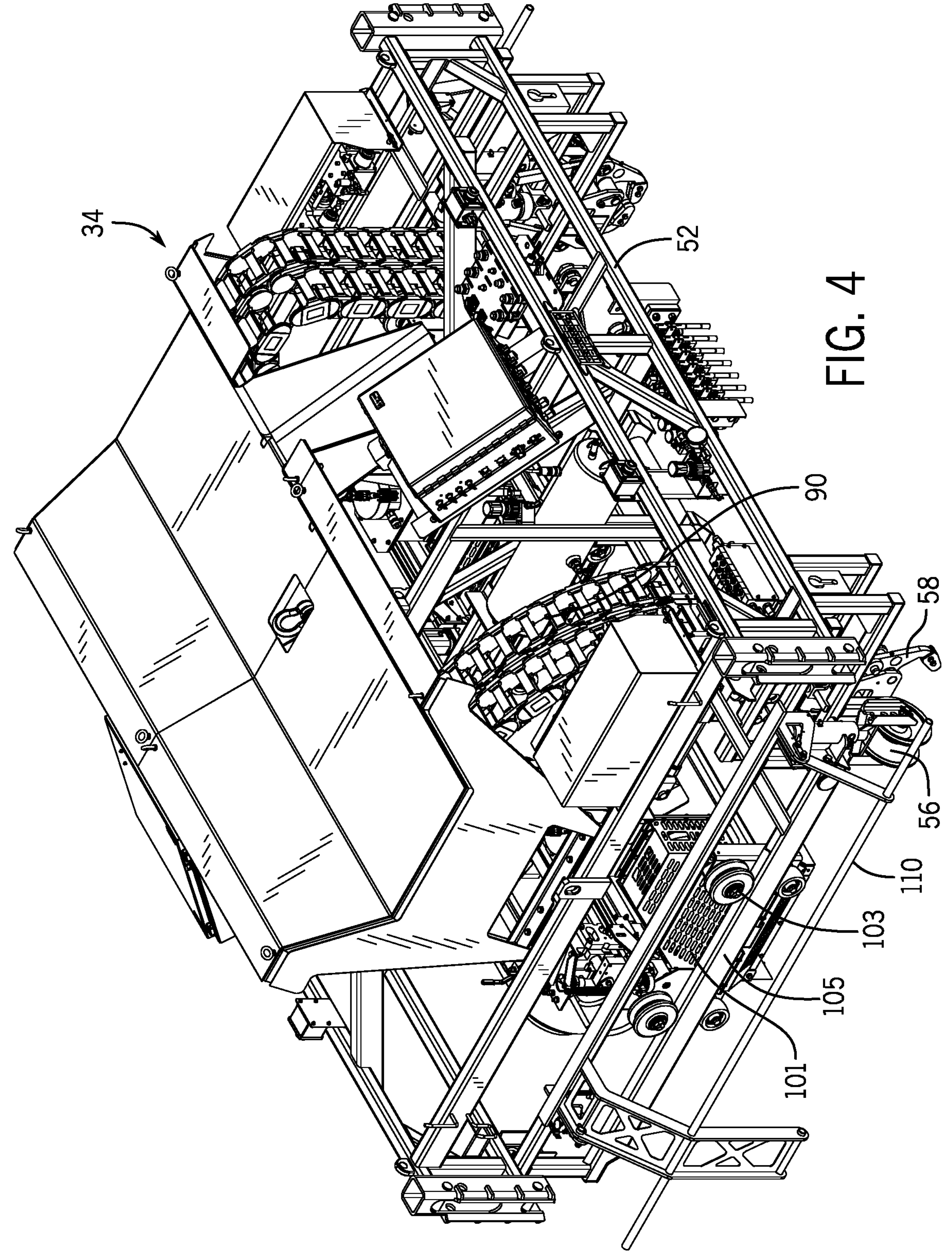
FIG. 4 is a perspective view of the shuttle cart of the tie filling machine of FIGS. 1-3.
Figure 5:
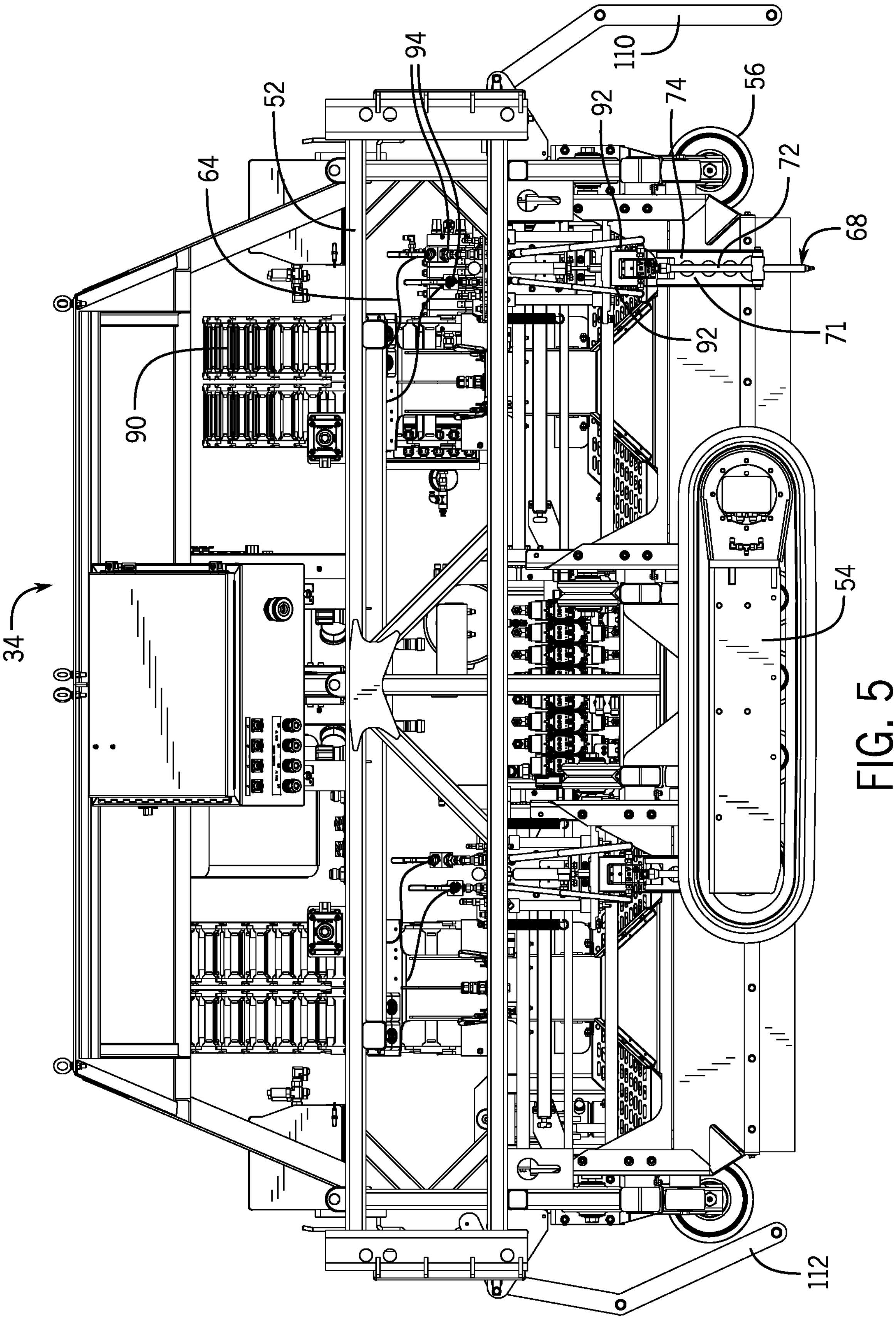
FIG. 5 is a side elevation view of a working side of the shuttle cart of FIG. 4.

Turning initially to FIGS. 1-3, the tie filling machine 20 is a self-propelled machine that moves along a railway 25. The machine 20 of this embodiment includes a mothership vehicle 32 that is propelled along the railroad 25, as well as a shuttle cart 34 that is a physically separate module from the mothership vehicle 32. The shuttle cart 34 is movable relative to the mothership vehicle 32, and is physically and/or wirelessly tethered to the mothership vehicle 32 as will further be described below. The mothership vehicle 32 has a chassis 33 that is supported on the remaining left rail 26 of the railway 25 on at least one set of wheels 36. The mothership vehicle 32 also includes one or more crawlers 38, which are also provided for supporting the machine 20 on the railbed 40 in the vicinity of the removed right rail, permitting propulsion along railway sections in which one rail 26 has been removed. Each crawler 38 is mounted on a mast 42 so as to be movable vertically into and out of engagement with the railbed 40 via operation of an associated hydraulic cylinder 44. The mothership vehicle 32 may also be configured with crawlers 38 on both sides of its chassis 33, allowing operation with both rails 26 removed from the track. The mothership vehicle 32 is propelled by a motive power source 46, such as a gasoline or diesel engine.

Still referring to FIGS. 1-3, the mothership vehicle 32 includes an operator workstation 48 which, in this embodiment, is enclosed cab. Operation of the mothership vehicle 32, as well as some of the operations of the shuttle cart 34, are controlled by an operator located in the operator workstation 48. The operator workstation 48 is located generally centrally of the chassis 33 adjacent the front end of the mothership vehicle 32 where the shuttle cart 34 is movable relative to the mothership vehicle 32. The operator workstation 48 preferably takes the form of an environmentally controlled enclosed cab that shields a seated operator within from the elements. Windows 50 may be provided on various sides of the operator workstation 48 to allow the operator to direct movement of the tie filling machine 20, including the mothership vehicle 32, the shuttle cart 34, as well as any associated components. The operator workstation 48 may include multiple controllers, displays, touch screens, and the like referred to collectively as user interface 206 in FIG. 12, that enables the operator to effectively operate the machine. For instance, the operator may use the controllers, displays, or touch screens to change any number of operating characteristics of the mothership vehicle 32 and the shuttle cart 34 described herein. These devices will henceforth collectively and individually be referred to as "interfaces" for the sake of conciseness. Further, the positions of the various moving components of the machine 20 may be monitored by the operator using fixed displays such as gauges or dials and/or variable displays such as touch screens. The status of any or all of the components of the machine could similarly be monitored by any combination of various electrical sensors, optical sensors, limit switches, etc. (not shown) and displayed to the operator via any desired combination of fixed or variable displays. Similarly, some of these components, or even the entire machine, could similarly be monitored or even controlled from a remote location using an interface that communicates wirelessly with the controller. The operator workstation 48 could be eliminated in this latter case.

The shuttle cart 34 will now be further described with reference to FIGS. 4-8. The shuttle cart 34 travels along the railroad to plug or fill the spike holes 22, and is movable relative to the mothership vehicle 32. The shuttle cart 34 includes a chassis 52 and at least one propulsion device that enables separate propulsion of the shuttle cart 34 along the railbed 40 relative to the mothership vehicle 32. The propulsion device takes the form of a crawler 54 in this embodiment. The crawler 54 is similar in operation to the crawler 38 associated with the mothership vehicle 32. The crawler 54 is located on a working side of the shuttle cart 34, meaning the side where a rail has been removed and the spike holes 22 are being filled. Of course, another crawler may be provided on the opposite side of the shuttle cart in an application in which both rails have been removed.

Additionally, the shuttle cart 34 includes first and second wheels 56 that rollably support the shuttle cart 34 on the rail 26 on the non-working side of the shuttle cart 34 opposite of the working side having the crawler 54. Further still, rail clamps 58 having first and second fingers or claws 60 may be positioned directly adjacent to each of the wheel guides 56. The rail clamps 58 are configured to be releasably adjusted between an opened position in which the first and second fingers 60 are spaced from the rail 26, and a closed position in which the first and second fingers 60 help secure the shuttle cart 34 to the rail 26.

In operation, the mothership vehicle 32 is typically propelled along the railroad at a substantially constant speed by its crawlers 38, while the shuttle cart 34 is able to move back and forth relative to the mothership vehicle 32 at different speeds by its crawler 54. The crawler 54 is powered by a hydraulic motor 55 using pressurized fluid supplied by the mothership vehicle 32, although other motors could similar be used to facilitate operation of the crawler 54. By allowing the shuttle cart 34 to be moveable relative to the mothership vehicle 32, the mothership vehicle 32 can move at a substantially constant speed, rather than starting and stopping every time a tie 24 is filled, which would result in frequent momentum changes to the mothership vehicle 32, and in turn the operator located therein. Of course, when the shuttle cart 34 is not filling spike holes 22, the mothership vehicle 32 and the shuttle cart 34 can move together along the railway at a substantially constant speed. When this occurs, the mothership vehicle 32 and the shuttle cart 34 can be mechanically coupled to one another.

Turning back to FIGS. 2 and 3, the shuttle cart 34 is connected to the mothership vehicle 32 by a tether 62 composed of a plurality of hoses 64 and cables. Alternatively, the shuttle cart 34 can be connected to the mothership vehicle 32 by a boom (not shown) containing the hoses 64. These hoses and cables 64 contain a variety of instruments and materials that connect or are transported between the mothership vehicle 32 and the shuttle cart 34. For instance, the hoses and cables 64 may include one or more of electrical wires or cables to transfer power, as well as instructions and data, to and from the mothership vehicle 32 to the shuttle cart 34, as well as chemical filling solution 30 or hydraulic fluid transported from the mothership vehicle 32 to the shuttle cart 34. It is conceivable that at least some aspects of the tether need not be physical. For example, electrical signals could be transmitted wirelessly between the mothership vehicle 32 and the shuttle cart via a RF, Bluetooth®, or other remote connection. Alternatively, the tether could form a more robust structure, such as an extendable boom mechanically coupling the shuttle cart 34 to the mothership vehicle 32 by the boom (not shown).

It also should be noted that that a separate mothership vehicle 32 and shuttle cart 34 are not essential to the use of vision to identify, locate, and manipulate railway features. It is conceivable that the shuttle cart 34 could be eliminated in favor of one or more traditional workhead(s) on a vehicle that has the other characteristics of the mothership vehicle 32 disclosed herein. In this case, a portion or potentially all of the longitudinal movement of the components carried by the shuttle cart 34 of the illustrated embodiment could be mounted on a workhead that is moveably longitudinally of a frame on the vehicle. An example of such longitudinally movable workhead is disclosed in the '692 patent.

Figure 6:
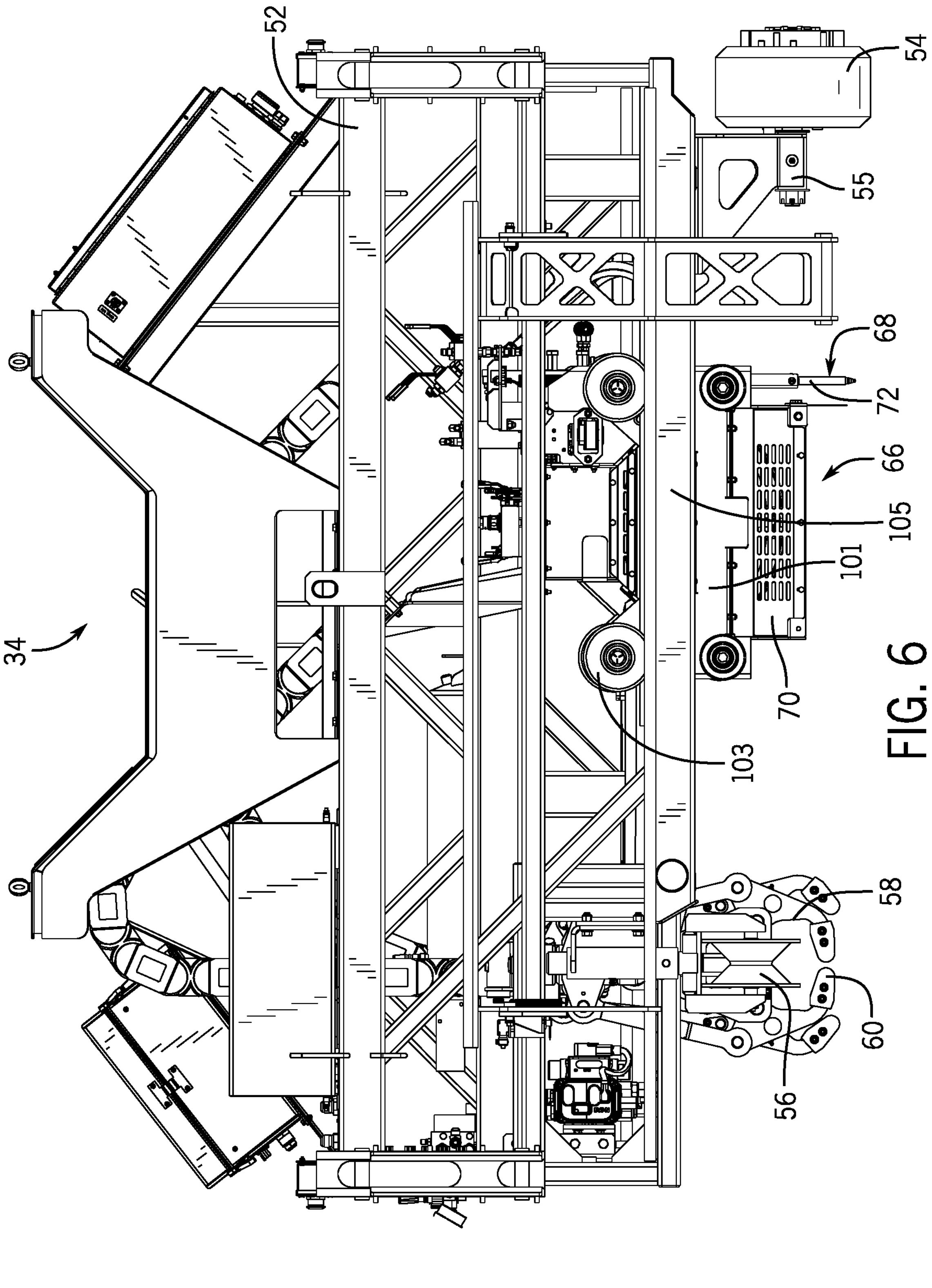
FIG. 6 a rear elevation view of the shuttle cart of FIGS. 4 and 5.
Figure 7:
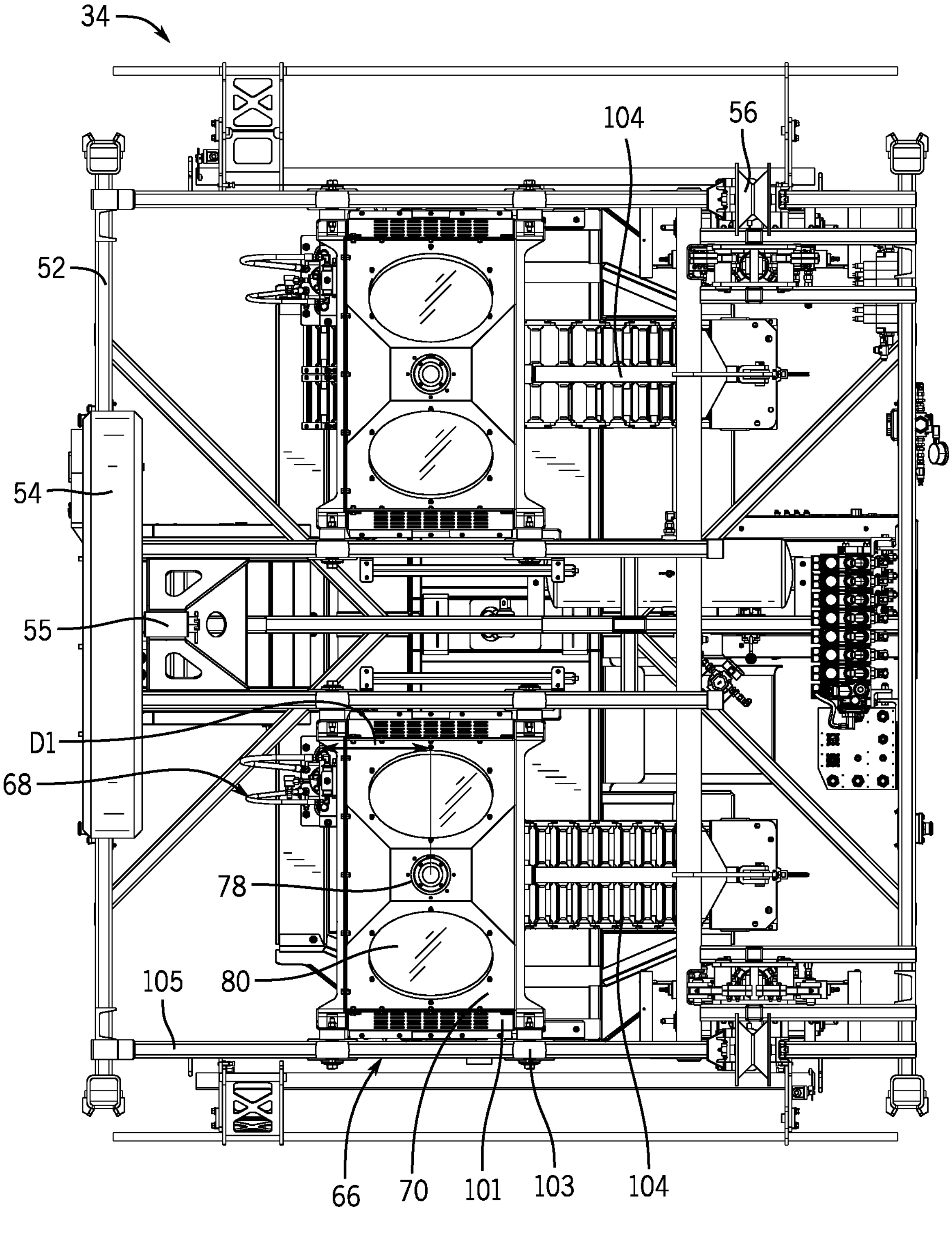
FIG. 7 is a bottom plan view of the shuttle cart of FIGS. 4-6.
Figure 8:
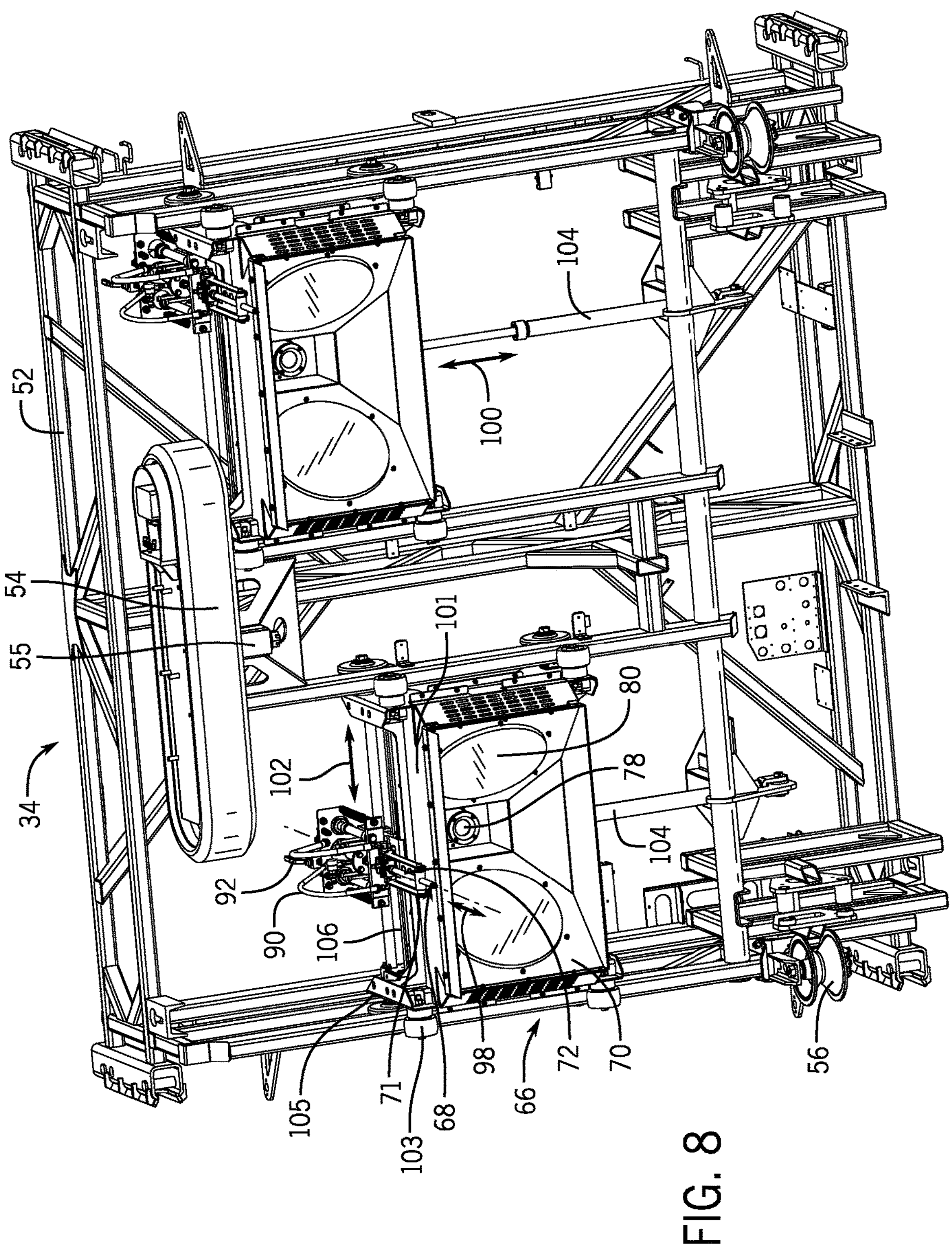
FIG. 8 is a bottom perspective view of the shuttle cart of FIGS. 4-7 showing first and second filler assemblies movable about multiple axis.

Returning again to the illustrated embodiment, the shuttle cart 34 includes one or more filler workheads 66 that are movable relative to the chassis 52, as best seen in FIGS. 6-8. The filler workheads 66 are configured to identify spike holes 22, determine the location of the spike holes 22 on the railbed 40, and detect the presence of spike holes 22 and to automatically fill the identified spike holes 22. First and second filler workheads 66A and 66B are provided one in front of the other in the illustrated embodiment. Providing two filler workheads 66A, 66B permits the machine 20 to act on two consecutive ties 24 simultaneously, increasing the workpace of the machine 20. The description of the common reference character "66" as used henceforth will apply equally to both filler workheads 66A and 66B unless otherwise specified.

As best seen in FIG. 8, the filler workhead 66 includes a frame 101 mounted on rollers 103 that move along rails 105 extending laterally of the railway. The frame 101 supports an imaging system 204 and an injection wand assembly 68 configured to inject chemical solution 30 into spike holes 22 formed in the ties as well as a hood 70. A hydraulic cylinder 104 is operable to drive the frame 101 along the rails 105.

Figure 11A:
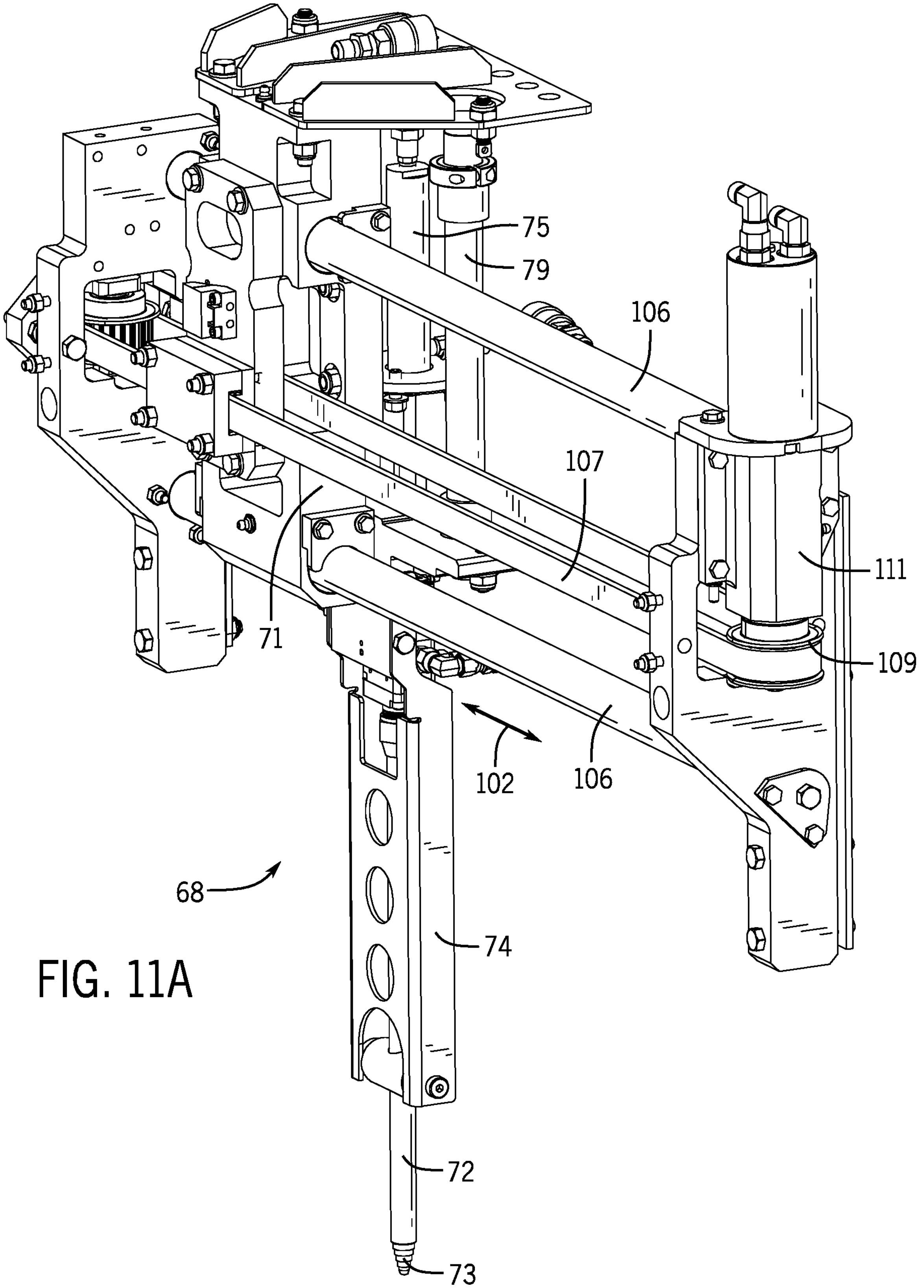
FIG. 11A is a detailed rear perspective view of the injection wand assembly in isolation.
Figure 11B:
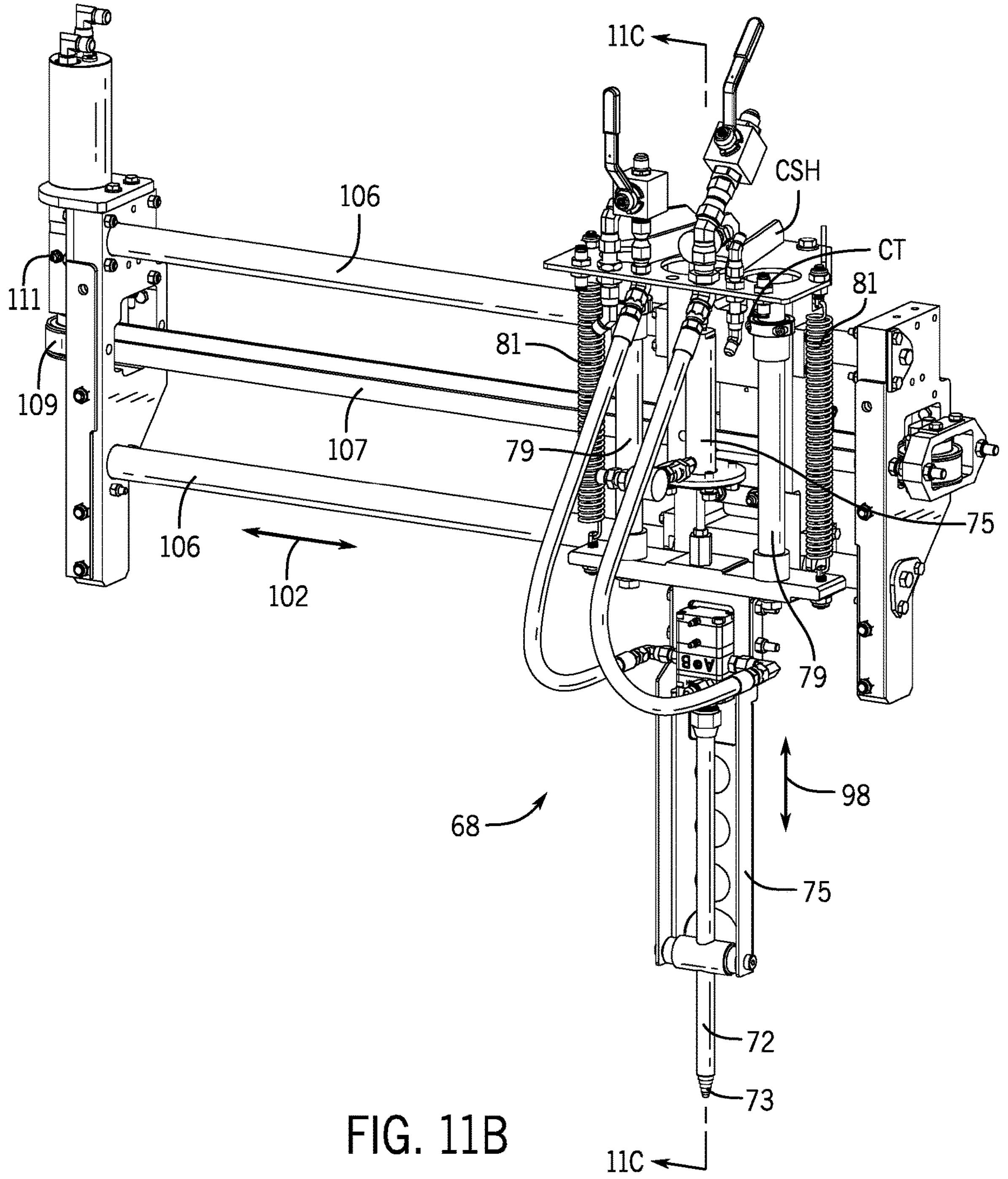
FIG. 11B is a detailed front perspective view of the injection wand assembly of FIG. 11A.
Figure 11C:
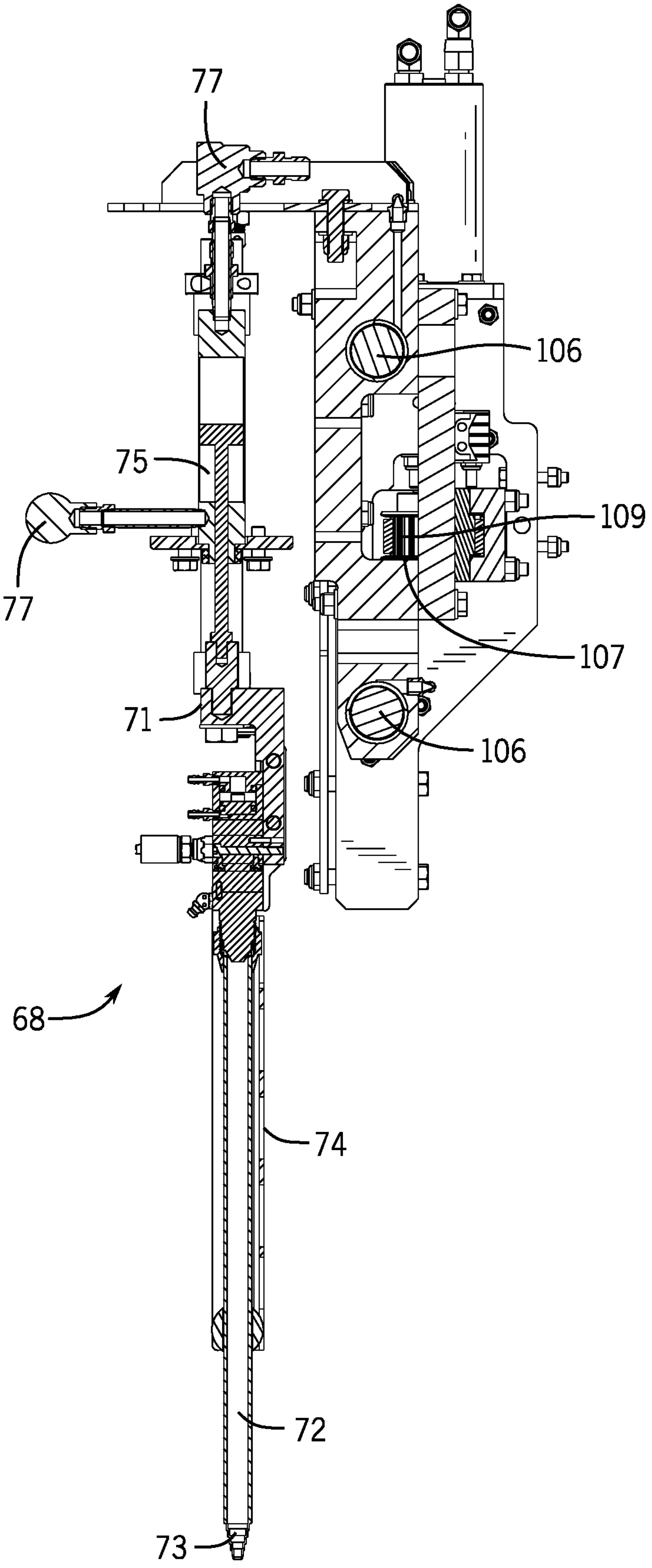
FIG. 11C is a cutaway side elevation view of the injection wand assembly taken about line 11C-11C of FIG. 11B.

The injection wand assembly 68 is best shown in FIGS. 11A-C and includes frame 71 fixedly mounted on the frame 101 of the filler workhead 66. The frame 71 is mounted on longitudinally extending guide rails 106 so as to movable back and forth in the longitudinal direction 102, as best seen in FIGS. 11A and 11B. This back and forth movement occurs under action of a belt 107 that is driven by a pully 109 that, in turn, is driven by a hydraulic motor 111. Still referring to FIGS. 11A-11C, the injection wand assembly 68 further includes a mixing tube 72, a mixing tube shield 74 surrounding the mixing tube 72, and various valves 76 configured to control flow of selected amounts of chemicals into the mixing tube 72. As shown, the valves 76 include manually operated shut-off valves that can be closed, for example, during maintenance to prevent the inadvertent leaking of chemicals down the injection wand assembly 68. The mixing tube 72 extends downwardly from the frame 71 and terminates in a tip 73 having a lower injection nozzle or orifice. One or more chemicals are deposited into the mixing tube 72 in desired proportions by the valves 76 and then mixed in preparation for deposit of the solution 30 into identified spike holes 22. The mixing tube shield 74 surrounds a portion of the mixing tube 72 to prevent inadvertent contact of the mixing tube 72 by other components.

Still referring to FIGS. 11A-11C, the injection wand assembly 68 can be driven to move vertically relative to the frame 71 and, thus, relative to the frame 101, by a Z actuator. In the present case, the Z actuator is a pneumatic cylinder 75 that extends and retracts in the vertical direction 98. Relieve valves 77 are provided at either end of the cylinder provided with relief valves 77 located at either end of the cylinder 75 in order to expedite movement of the injection wand assembly 68 in the vertical direction. Additionally, vertical guide rods 79 may be mounted adjacent to the cylinder 75 to guide the injection wand assembly 68 during its vertical movement relative to the shuttle cart 34. Further, springs 81 may be mounted adjacent to the cylinder 75 in order to bias the injection wand assembly 68 away from the tie 24 once the spike hole 22 has been filled. The springs 81 bias the cylinder 75 away from the spike hole 22 so that the injection wand assembly 68 is withdrawn from the spike hole 22 even if air supply to the air cylinder 75 is terminated so that the tip 73 is not stuck within the spike hole 22 even if the machine is powered down or air pressure otherwise is lost.

Figure 9A:
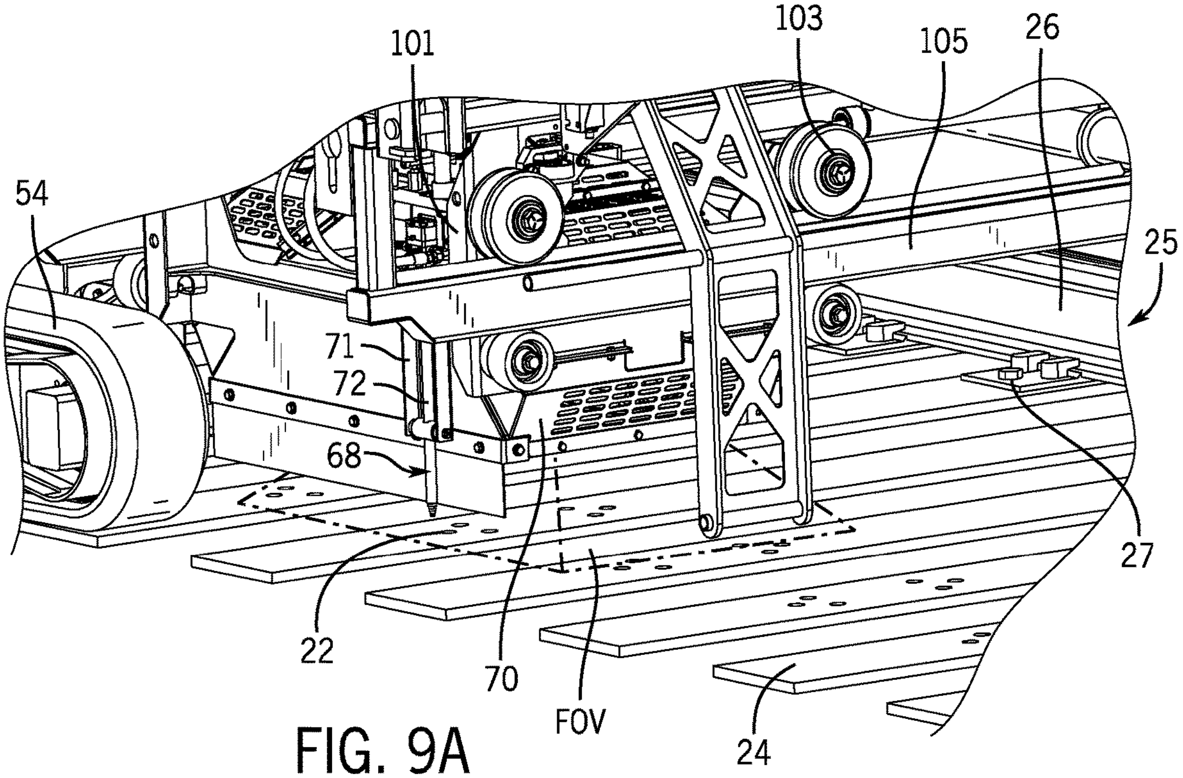
FIG. 9A is a perspective view of the shuttle cart of FIGS. 4-8 when an imaging device identifies a plurality of holes formed in a tie.
Figure 9B:
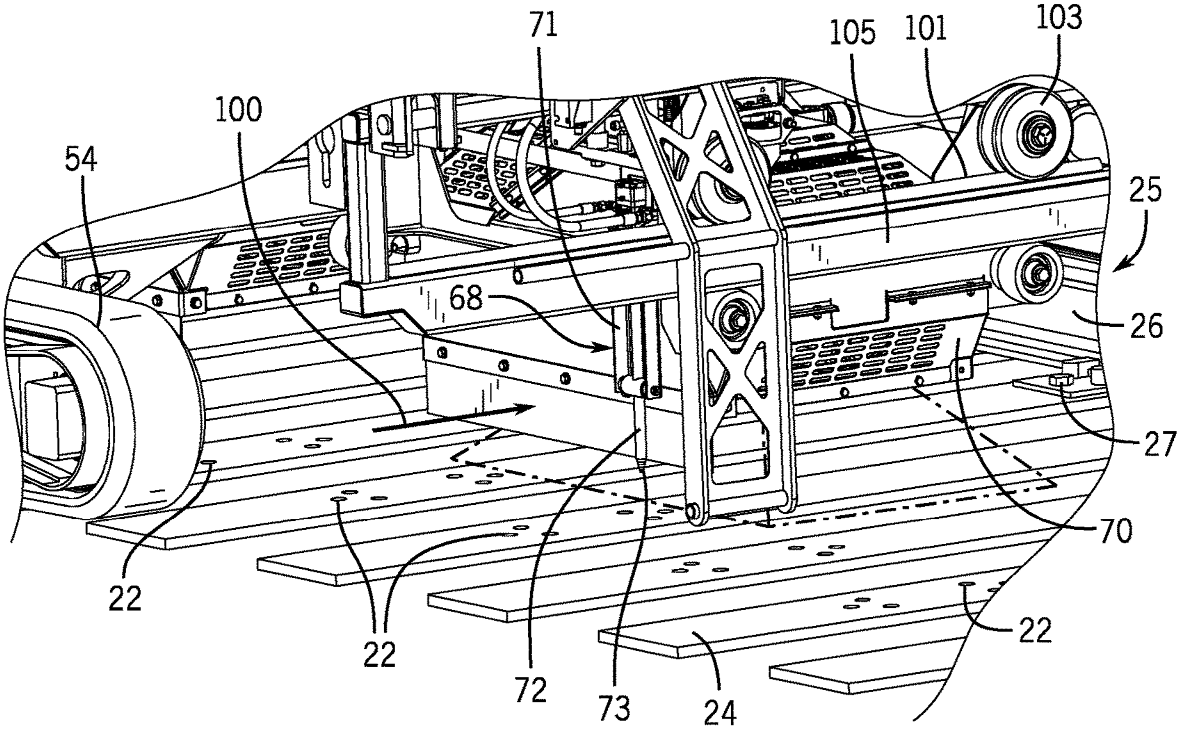
FIG. 9B is a perspective view of the shuttle cart of FIG. 9A in which an injection wand assembly is moved in a lateral direction to align with one of the plurality of holes formed in the tie along the lateral axis.
Figure 9C:
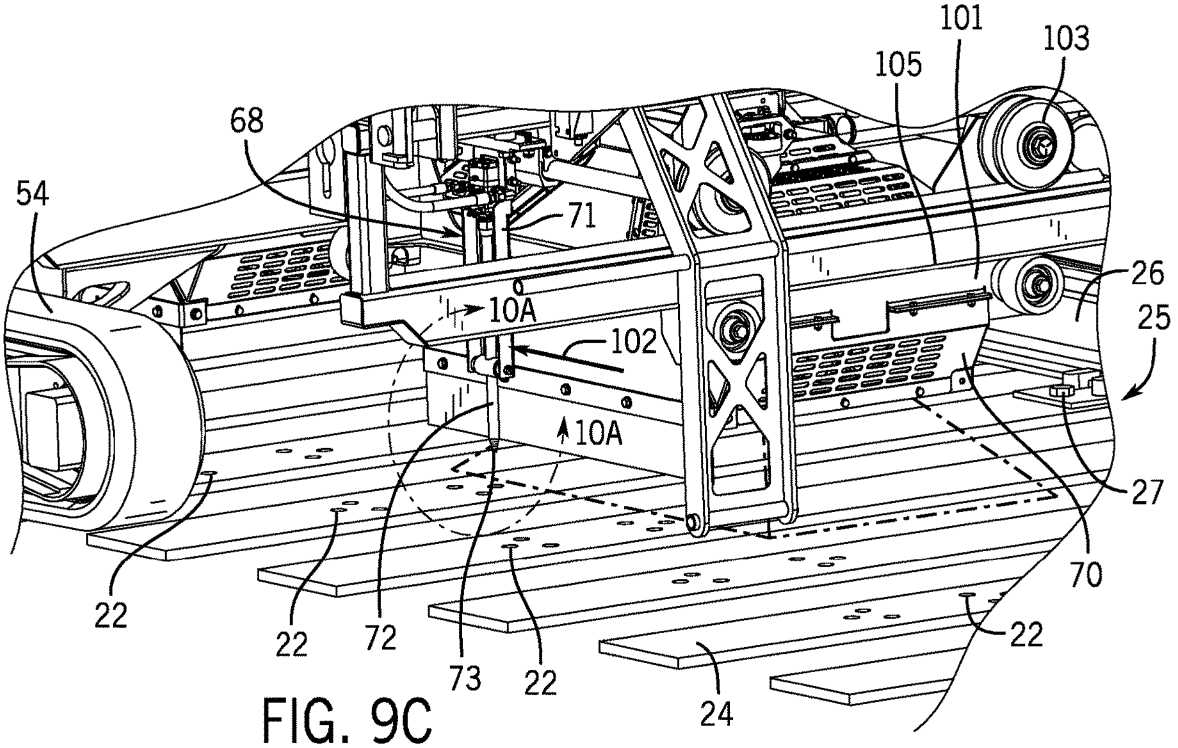
FIG. 9C is a perspective view of the shuttle cart of FIGS. 9A and 9B in which the injection wand assembly is moved in a longitudinal direction to overlie one of the plurality of holes formed in the tie.

Referring again to FIG. 8, the hood 70 is located directly adjacent to the injection wand assembly 68, and overlies the imaging device 78. The imaging device 78 of this embodiment is a camera 78 facing downwardly from the shuttle cart 34 to a tie 24 and at least one light 80 configured to illuminate the tie 24 while the camera 78 captures still or video images of the tie 24 and surrounding features as identified by the field of view FOV identified in FIG. 9A. More specifically, the camera 78 in the illustrated embodiment is a BASLER camera model Ace U acA720-290gc camera, equipped with 4.5 millimeter wide-angle C-mounted lens. Of course, other cameras and lenses having similar characteristics could similarly be used with the present machine 20. The images are then analyzed using computer vision (CV) software to identify the specific location of each tie 24 and of spike holes 22 in each tie 24 using artificial intelligence (AI). The CV software could be located within the controller 202 and/or located in cloud-based external server in wireless communication with the controller 202.

In one embodiment, the CV software uses Tensorflow software, which is an open-source software library for machine learning and artificial intelligence that can be used across a range of tasks, with a focus on training and inference of deep neural networks. The Tensorflow software includes two stages: training and inference. In the training stage, a large amount of data is collected and stored. In the present invention, the data is images associated with specific portions of a railway, for instance, of ties and holes formed in the ties. This data is annotated and labeled using a labelling software to draw boxes around the ties and holes and label them respectively. Once the images have been labeled, the Tensorflow software then develops a model based on the provided data. In the present embodiment, an object detection model is generated, which is used to identify all instances of a particular object within a single image. The model is essentially an equation or process where an input type is entered (in the present invention, an image) and the software outputs the coordinates and confidence score of items detected in the image. The model is then shared across the machine 20. The CV software is configured to continuously refine the training process, such that the model is constantly updated to improve performance. The training stage may be started from scratch, or it can be built off of a pre-trained model. In one embodiment, a pre-trained Fastere-RNN model is used that begins the ability to perform object detection, which is further refined based on the objects being identified.

In the inference stage, the model that was previously created during the training stage is actually put to use. As will further be described below, an image is acquired from the imaging device 78 and is fed into the model. The model then identifies a specific type of item, such as a railroad tie 24 or a spike hole 22, and a confidence score is calculated. This information is transmitted to the controller 202, and various components of the machine 20 are appropriately moved and manipulated as will be described below.

Identification and filing of spike holes 22 will now be described.

In operation, the shuttle cart 34 is configured to move along the railway 25 and the mothership vehicle 32 as the mothership vehicle 32 is independently propelled along the railway 25 while images are acquired via the camera. The images may be still images and/or video frames. The acquired images are then analyzed by the CV software, against a model including a database of photographs of previously identified spike holes 22. As described, the model may be dynamic and be updated as the machine 20 moves along the railway 25, otherwise it may be static. Initially, the tie 24 is identified and images of the tie 24 are taken by the camera 78. The images are then transmitted to the controller 202 and/or to a remote server for analysis. In either event, the images are compared to the model including a database of images using the CV software described above in order to identify the existence and location of the ties 24 as well as the existence and location of the spike holes 22 in the ties 24. In many instances, a pattern of four spike holes 22 will be identified, although the CV software can similarly identify any number of spike holes 22 that may be present in a given tie 24.

Figure 15:
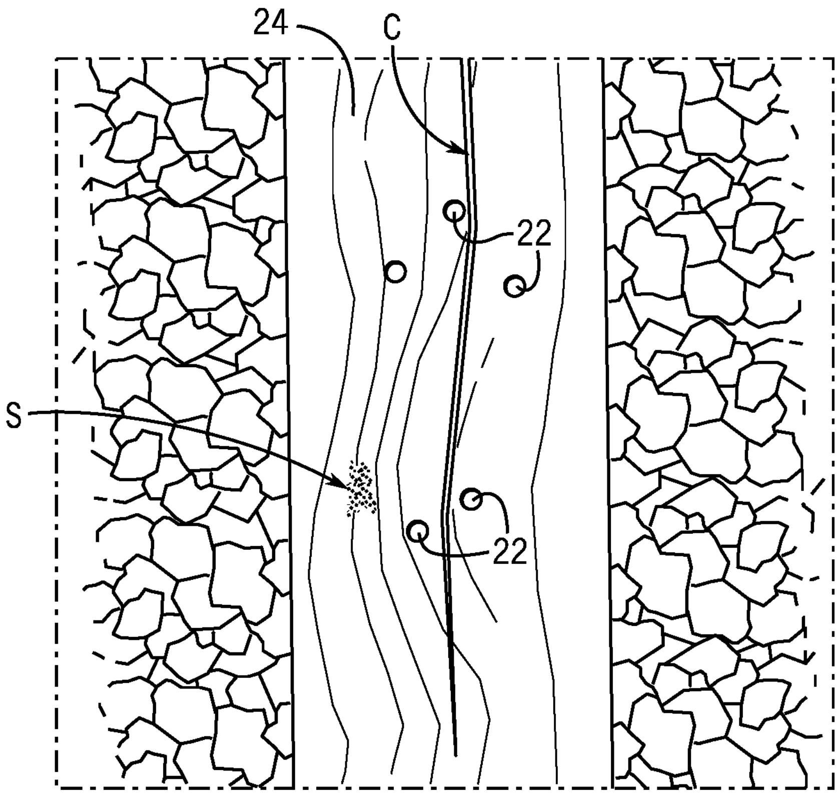
FIG. 15 is an image of a tie plate with various features identified.

While analyzing the images, the CV software is configured to specifically identify spike holes 22 as such, while also disqualifying other railway features, such as cracks in the tie, imperfections in the tie such as knots, stains, ballast rocks or other foreign objects located on a tie 24, and the like. FIG. 15 shows a sample tie 24 that includes spike holes 22 along with a crack "C" and a stain "S", where the CV software differentiates the various features. Furthermore, the CV software may be configured to toggle between different modes in which characteristics such as color may differ, for instance, to reflect changes in conditions of the tie 24 such as the presence of a foreign object, including snow or rain on top of the tie 24. To do so, the CV software compares images taken by the camera 78 to a database of images in snowy conditions or a database of photographs in rainy conditions. The system may continue to collect and analyze all images taken, dynamically updating the database with new images, which further improves the accuracy of the CV software.

After the spike hole 22 locations have been confirmed, the cylinder 104 is driven to move the frame 101 along the rails 105 laterally relatively to the shuttle cart chassis 52 as shown by arrow 100, and motor 111 can be actuated to drive the belt 107 to move the injection wand assembly 68 longitudinally of the frame 101 as shown by arrow 102 until the injection wand assembly 68 directly overlies an identified spike hole 22. As can be seen in FIGS. 8-10F, the cylinders 75 then can be actuated to move the injection wand assemblies 68 vertically, as shown by arrow 98, to fill the spike hole. Specifically, the tip 73 of the tube 72 is lowered into a first detected spike hole 22, filled with solution 30 and then raised, after which the position of the wand assembly 68 is adjusted laterally and longitudinally to position the tip 73 of the tube 72 over each subsequently detected spike hole 22. The tip 73 is preferably inserted at a distance far enough into the spike hole 22 to ensure the filling solution 30 is deposited within the spike hole 22, without going so far into the spike hole 22 as to cause splashing within the spike hole 22 or otherwise prevent the spike hole 22 from being fully filled. For instance, in a preferred embodiment, the tip 73 is lowered into a detected spike hole 22 to approximately a quarter of an inch beneath the top surface of the tie 24. Of course, depending on the characteristics of the detected spike holes 22, the tip 73 may be inserted into the spike hole 22 at a distance greater than or less than a quarter of an inch. For instance, where the spike holes 22 for a particular set of ties 24 are deeper than typical spike holes, the tip 73 may be inserted at a distance deeper than a quarter of an inch. To the contrary, where spike holes 22 for a particular set of ties 24 are shallower than typical spike holes, the tip 73 may be inserted at a distance less than a quarter of an inch. The operator may set the insertion depth of the tip 73 by an interface connected in the cabin 48 in communication with the controller 202.

The injection wand assembly 68 receives chemical solution from one or more storage tanks. In the illustrated embodiment, a solution 30 is a two-part resin solution. The two components are stored in large storage tanks 86, 88, on the mothership vehicle 32 and then transferred to the shuttle cart 34 through one or more of the hoses 64 of the tether 62. Of course, storage tanks of the solution could similarly be mounted on the shuttle cart 34. The hoses 64 may be housed within a hose protector 90 that extends laterally along the chassis 52 of the shuttle cart 34. The chemicals are then delivered to the mixing tube 72 through additional hoses 92 under the control of valves 94 that are automatically actuated by the controller 202. Each tank 86, 88 preferably has a sufficient capacity to permit continuous operation of the shuttle cart 34 for an extended period of time. A per-tank capacity of at least 50 gallons, and more preferably at least 100 gallons, is typical.

The solution 30 is typically deposited into the spike holes 22 for between approximately 600-2,000 milliseconds, and more typically approximately 800 milliseconds depending on a number of factors, including for instance the viscosity of the material, the temperature of the material and outdoor conditions, and the size of the spike hole 22. About 1.5 to 3 inches$^3$, or between 25 and 50 milliliters, of solution, and more preferably typically approximately 2.15 inches$^3$ or 35 milliliters of solution, are deposited within each spike hole 22 as a result of this process. Of course, an operator can use the interface to adjust the length of time that the filling solution is sprayed from the injection wand assembly 68 and the quantity of filling solution 30 that is deposited into the spike hole 22. In optimized conditions, the machine 20 preferably fills the spike holes associated with 15-20 ties per minute.

The machine 20 may also be equipped with additional components to ensure proper interaction between the mothership vehicle 32 and the shuttle cart 34. For instance, mothership vehicle 32 may include a sensor (not shown) that monitors the distance between the mothership vehicle 32 and the shuttle cart 34. Similarly, a rangefinder (not shown) may be used that measures the distance between the mothership 32 and the shuttle cart 34. Further still, the distance between the mothership vehicle 32 and shuttle cart 34 may also be monitored using a physical leash (not shown) that helps the operator monitor the distance between these components, and terminate movement if the measured distance surpasses a designated amount. Whether a sensor, rangefinder, or physical leash is used, machine operation can be controlled so that a maximum permissible distance, for instance between 5' and 8' and, more typically, between 6' and 7', between the mothership vehicle 32 and shuttle cart 34 cannot be exceeded. Additionally, the shuttle cart 34 may include safety bars 110, 112 on either end of the shuttle cart 34. Both safety bars 110, 112 are pivotable about the chassis 52 of the shuttle cart 34. When either bar 110, 112 is pivoted due to contact with another object, propulsion of the shuttle cart 34 can be terminated, and the operator can be notified to ensure appropriate safety measures are in place.

Figure 12:
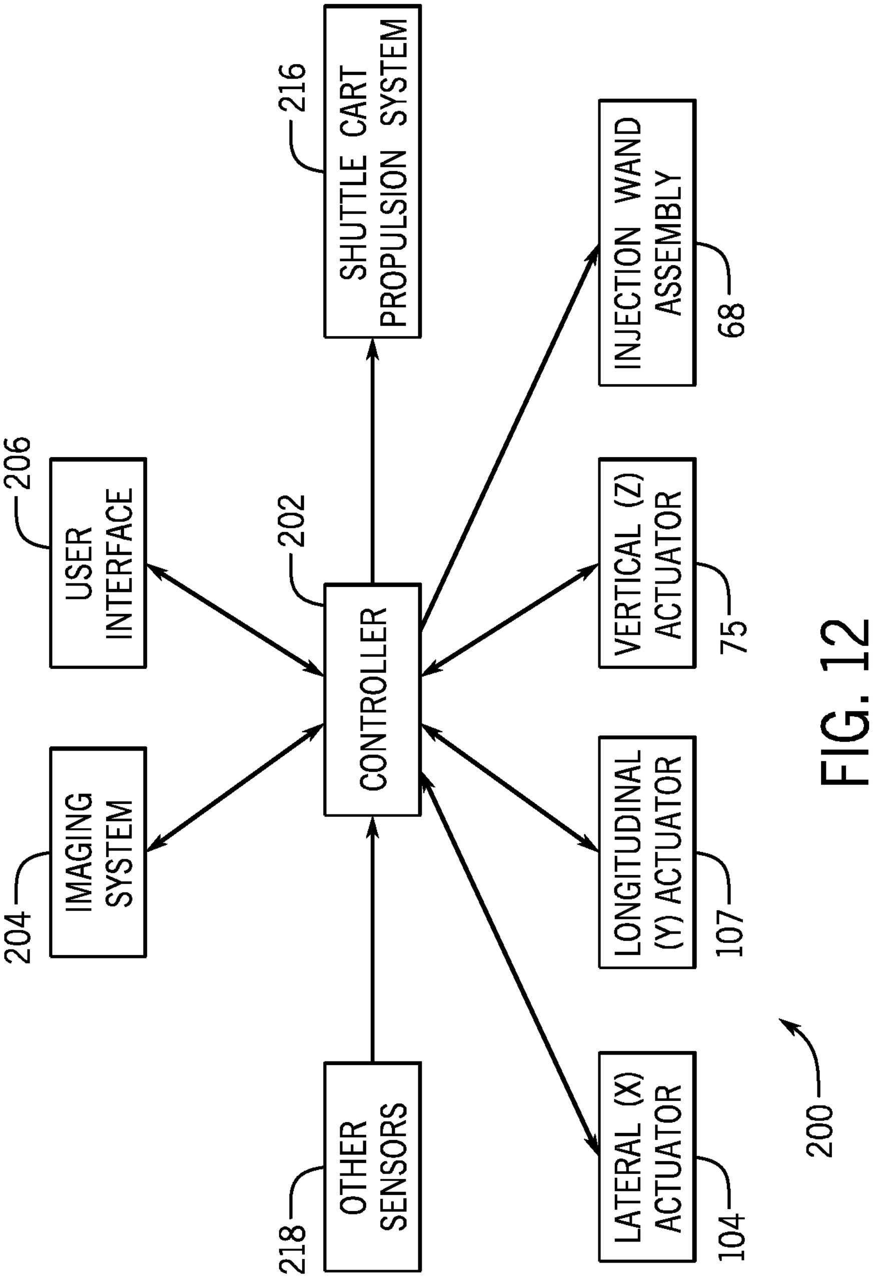
FIG. 12 is a schematic representation of the tie filling machine that automatically detects and fills spike holes.

Turning to FIG. 12, the various components of the system 200 for identifying and filling spike holes 22 are illustrated. Many of the components described above are shown in this schematic, including the controller 202, the imaging system 204 including the camera 78 and a processor, the user interface 206, the cylinder 104 that accounts for lateral motion of the imaging system 204, the belt 107 that accounts for longitudinal motion of the imaging system 204, the cylinder 75 that accounts for vertical motion of the imaging system 204, and the injection wand assembly 68. Further, a shuttle cart propulsion system 216 that includes the crawlers 54 is also provided. Other sensors 218 may also transmit data and information to the controller 202. The imaging system 204 and user interface 206 are configured to both transmit data and information to the controller 202, as well as receive data and information from the controller 202. Similarly, the cylinder 104 that accounts for lateral motion of the imaging system 204, the belt 107 that accounts for longitudinal motion of the imaging system 204, the cylinder 75 that accounts for vertical motion of the imaging system 204, and the injection wand assembly 68 both receive data and information from the controller 202, as well as transmit information and data to the controller 202 to confirm that the injection wand assembly 68 has reached a desired location. The controller 202 is configured to push data and information to the shuttle cart propulsion system 216, as well as the injection wand assembly 68.

Figure 13A:
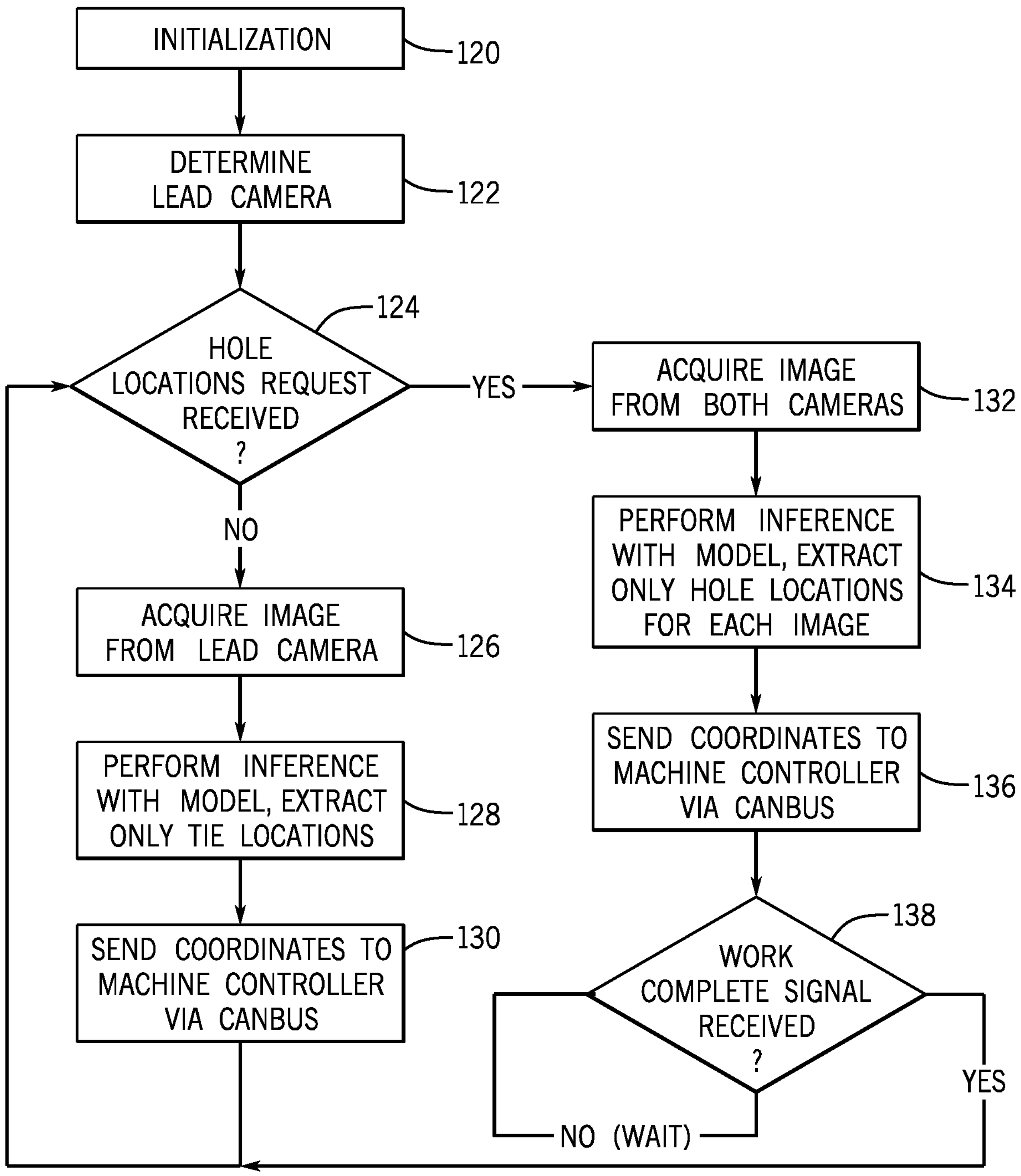
FIG. 13A is a flow diagram illustrating initialization of the computer vision (CV) software used to automatically detect and fill spike holes.
Figure 13B:
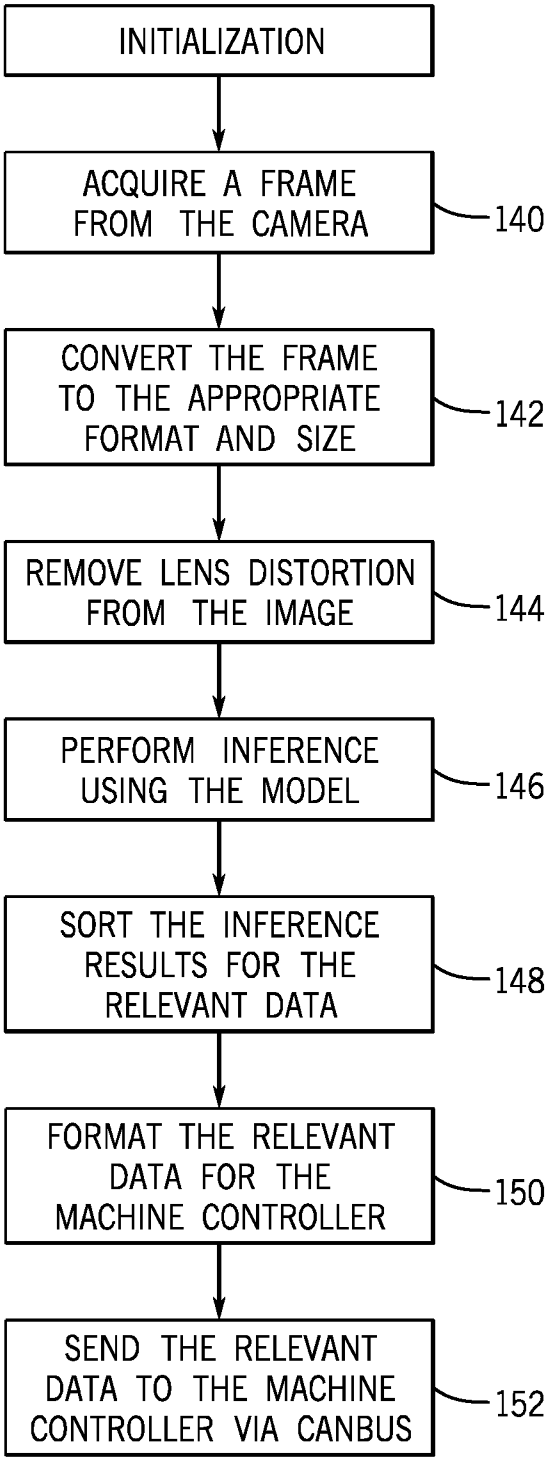
FIG. 13B is a flow diagram illustrating the spike hole recognition.
Figure 14:
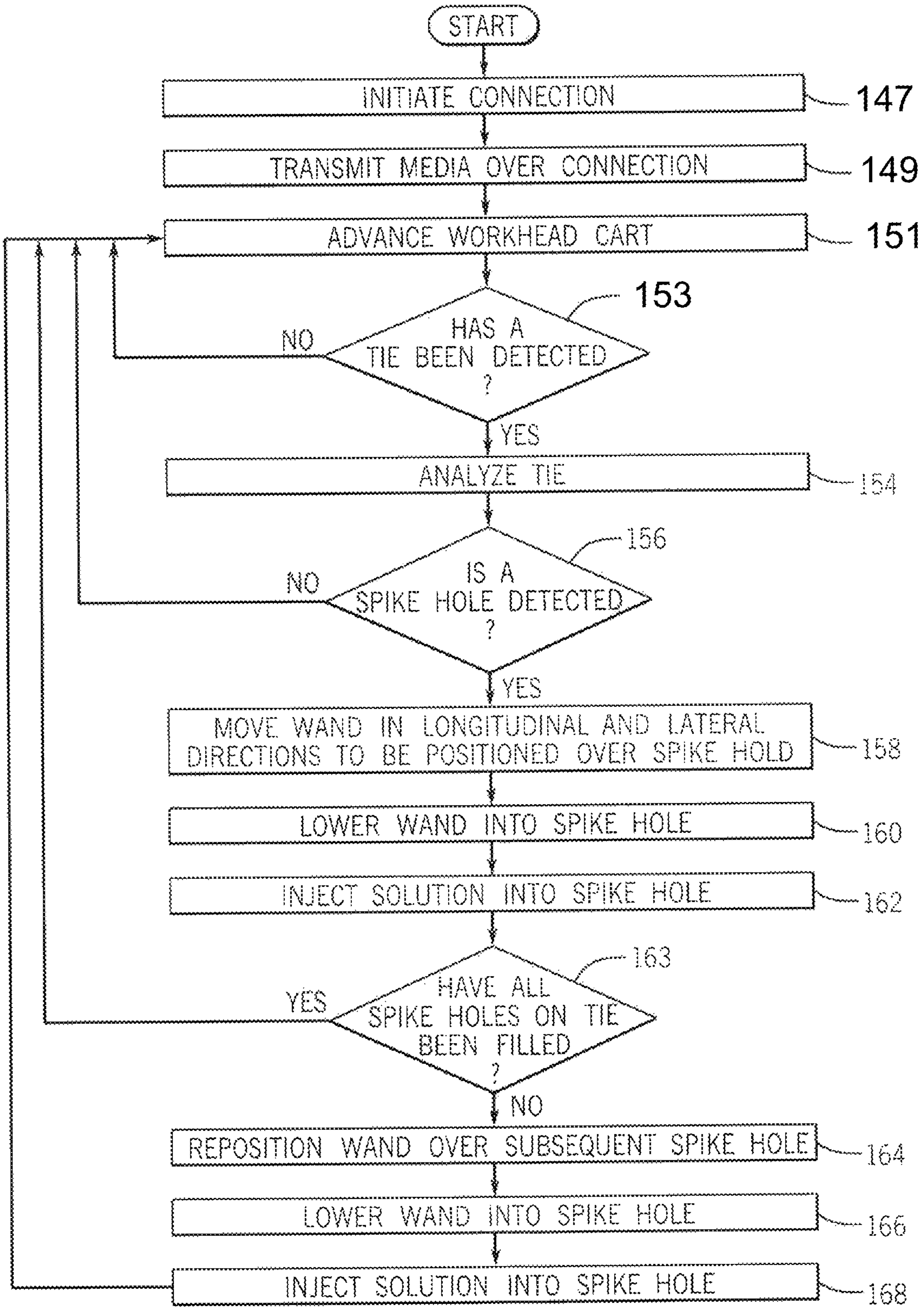
FIG. 14 is a flow diagram illustrating the general system operation of the tie filling machine.

Turning next to FIGS. 13A, 13B, and 14, exemplary flow diagrams are provided to further illustrate operation of the machine 20. Looking to FIG. 13A, a first flow chart illustrates the initialization process at block 120 associated with the CV software that occurs at the processor of the imaging system 204 when the injection wand assembly 68 is located over a tie 24. Next, at a determination step 122, a camera 78 is designated as the lead by the operator. For instance, depending on whether the shuttle cart 34 is filling spike holes 22 on the left or the right side of the railway 25, one of the two cameras 68 will be the lead, whereas the other of the two cameras 68 will be lead if the shuttle cart 34 is filling spike holes 22 on the right-side of the railway. Next, an inquiry is made at block 124 as to whether a hole locations request has been received from the CV software. If no hole location request has been received, the lead camera 78 acquires a video or still image at block 126. The image is then processed by the model of the CV software, and the location of the tie 24 is extracted at block 128 once the tie is recognized or identified. Thereafter, the coordinates of the tie 24 are transmitted to the controller 202 by a CAN channel at block 130. Once the hole locations request is received, images are acquired by both cameras 78 at block 132. If it is determined in block 124 that a hole location request has been received, images are acquired in block 132, and the process proceeds to block 134, where spike holes 22 are identified as such using the model, and the locations of the identified spike holes 22 are assigned to a coordinate system in terms of lateral and longitudinal (“X” and “Y”). The coordinates are then sent over CAN to the controller 202 at block 136. At block 138, a determination is made as to whether work is complete, and the signal/coordinates have been received. If the answer is “no”, the determination is repeated. If the answer is “yes”, the hole locations step at block 124 is repeated.

Looking to FIG. 13B, a second flow chart is provided that illustrates the processing of images from the camera 78 by the processor of the imaging system 204. Initially, a frame is acquired from the camera at block 140. Once acquired, the frame is converted to appropriate format and size at block 142. Additionally, any lens distortion of the image is removed at block 144. Next, the image is fed into the model, and the model performs the inference step at block 146, in which the model detects a spike hole or holes 22. After that, the inference results are sorted for relevant data at step 148. The relevant data is then formatted for the controller 202 at step 150. Finally, the formatted data is sent to the controller 202 over the CAN at step 152.

Next, FIG. 14 shows another simplified flow diagram of the process of controlling the machine 20 by the controller 202, working with the imaging system 204, to identify, locate, and fill spike holes 22. At block 145446, connection is initiated by the camera 78 and the CV software as discussed above in connection with FIG. 13A, after which media is transmitted to the controller 202 over the CAN at block 147. Next, the shuttle cart 34 is advanced longitudinally along the rail at block 149 by driving the crawler 54. Then, at block 151, the CV software determines whether a tie 24 has been detected. If not, the workhead cart is advanced along the railway to continue to search for a tie. If so, the shuttle cart stops over the tie. This moving along the rail to position the imaging device over the next tie of the railway can be considered "indexing". The tie 24 is analyzed by the CV software at block 154. Once the tie is detected and the imaging device is indexed over it in block 154, the CV software then determines the presence and location of any spike holes 22. If any spike holes are located, the injection wand assembly 68 is moved in a lateral and longitudinal direction under power of the cylinder 104 and the motor 111 in combination with the belt 107, respectively, until the tube 172 of the injection wand assembly 68 is positioned over the spike hole 22 at block 158. Once the injection wand assembly 68 is properly positioned in block 158, the cylinder 75 is actuated to lower the injection wand assembly 68 to insert the tube tip 73 into a first spike hole 22 at block 160, and a chemical solution 30 is injected into the spike hole 22 at block 162. The wand assembly 68 then is raised to lift the tube tip out of the spike hole. An inquiry is then made in block 163 as to whether all of the spike holes in the subject tie have been filled. If not, the process proceeds to block 164 and the injection wand assembly 68 is repositioned in X and Y over a subsequent spike hole 22 at block 164. The injection wand assembly 68 is then lowered to place the tube tip 73 into the subsequent spike hole 22 at block 166, and the solution 30 is injected into the spike hole at 168. The wand assembly 68 then is raised again, and the process returns to the inquiry block 163. Once it is determined in inquiry block 163 that all spike holes 22 of a given tie 24 have been filled, the process returns to block 151, and the shuttle cart 34 is advanced along the track to index the imaging system over the next tie 24.

While the above description relates to filling spike holes 22 in a single tie 24, since there are two cameras 78, injection wand assemblies 68, and associated components, spike holes 22 in two ties 24 could be filled simultaneously by the first and second injection wand assemblies.

As described above, while the detailed description primarily discusses use of the machine 20 to identify the location of spike holes 22, the vision system described herein, or contemplated variations of it, could similarly be used to visually identify, locate, and act on other railway features. Such features include, but are not limited to, tie plates, spikes, rail anchors, and rail clips. The tool could act upon the feature by one or more of removing it, placing it, attaching it (such as by driving a spike or applying an anchor or clip), removing it (such as by pulling a spike or "spreading" anchors), etc.

Figure 16:
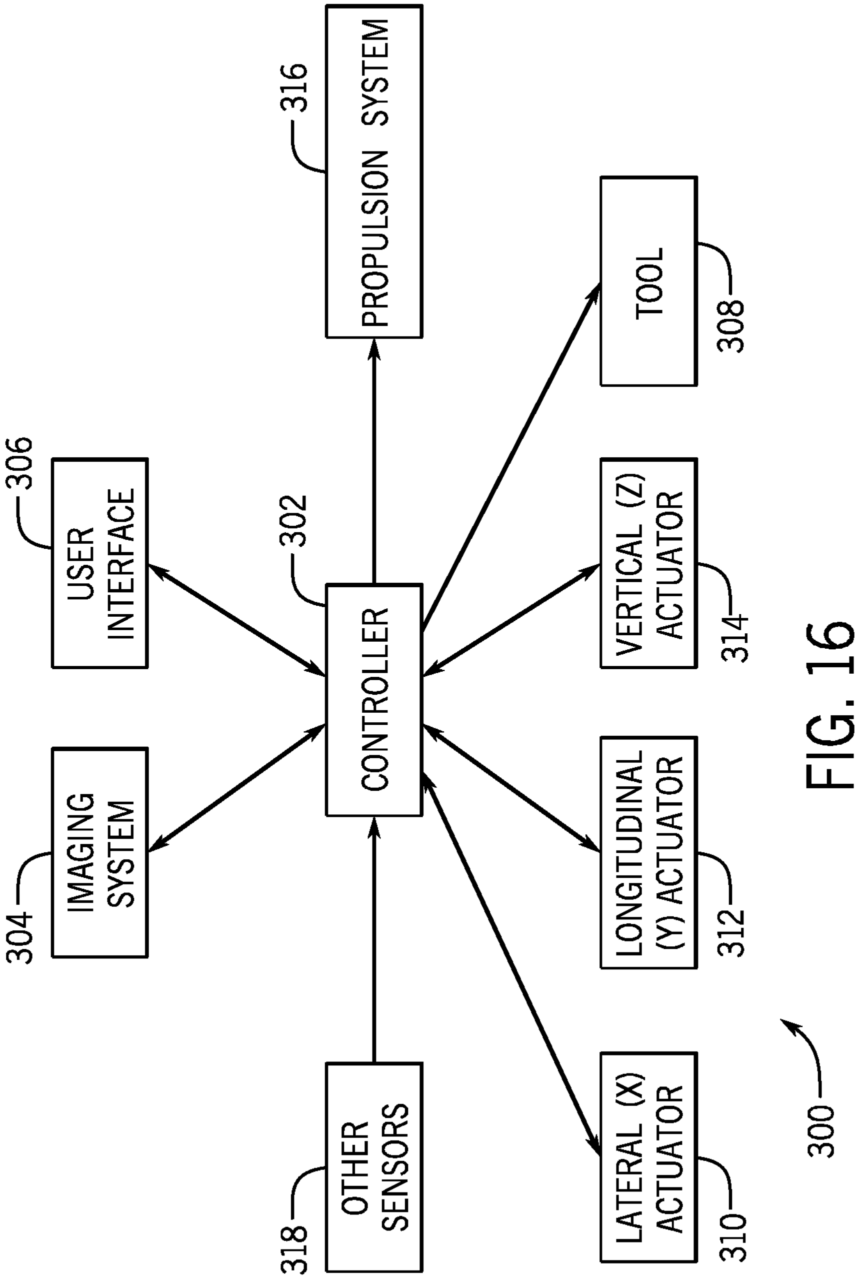
FIG. 16 is a schematic directed to an automatic tie plate locator.

For instance, FIG. 16, provides a schematic of one such system 300 in which the machine can be used to identify, locate move, and/or replace a tie plate. This system 300 includes a number of components that operate substantially similarly to those described in system 200, including a controller 302, an imaging system 304 including a camera (not shown) and processor, a user interface 306, and propulsion system 316, as well as other sensors 318. If the system has a mothership vehicle and a shuttle cart, the propulsion system will control both vehicles as described above. If the system has a single vehicle with a workhead movable longitudinally along a frame of the vehicle, the drive for effecting that longitudinal movement can be considered part of the propulsion system. Additionally, the system 300 includes a tool 308 that is configured to move a tie plate 28 (see FIG. 3) along the tie 24 laterally of the railway. Additionally, the system 300 includes multiple actuators to facilitate movement of the tool 308 relative to the railway, including a lateral actuator 310 to facilitate movement along the x-axis, a longitudinal actuator 312 to facilitate movement along the y-axis, and a vertical actuator 314 to facilitate movement along the z-axis. The imaging system 304, user interface 306, lateral actuator 310, longitudinal actuator 312, and vertical actuator 314 are all configured to both transmit data and information to the controller 302, as well as receive data and information from the controller 302. The controller 302 is configured to control operation of the propulsion system 316, as well as the actuators for the tool 308.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A railway maintenance machine comprising:

a chassis, the chassis being configured for movement along a railway;

an imaging device which faces downwardly towards the railway and which is configured to acquire images of the railway;

a tool that is associated with the imaging device and that is configured to manipulate a railway feature; and a controller that is coupled to the imaging device and the tool, the controller including:

a railway feature detecting module including instructions that, when executed, compare an image captured by the imaging device to a database of images of railway features; and an execution module including instructions that, when executed, automatically move the tool into alignment with a detected railway feature and cause the tool to interact with the railway feature, wherein the railway feature is a spike hole in a railroad tie, wherein the tool is an injection device, and wherein the instructions executed by the execution module cause the injection device to inject a chemical into the spike hole to fill the spike hole.

2. The railway maintenance machine of claim 1, wherein the imaging device comprises:

a camera, a hood overlying the camera, and at least one light located adjacent to the camera.

3. The railroad maintenance machine of claim 1, wherein the railway feature detecting module is configured to detect and determine the location of the railroad tie in which the spike hole is formed before detecting and determining the location of the spike hole, and wherein the execution module includes instructions that, when executed, automatically stop the vehicle in a position in which the spike hole is accessible by the injection device.

4. The railroad maintenance machine of claim 3, wherein the railway feature detecting module is configured to, while the vehicle is stopped over the tie, detect and determine the locations of other spike holes in the railroad tie, and wherein the execution module is configured to sequentially automatically position the injection device over the other spike holes and to inject the chemical into the other spike holes.

5. The railroad maintenance machine of claim 1, further comprising powered actuators that are mounted on the vehicle, and wherein the execution module is configured to control the powered actuator, in response to determination of the location of the spike hole by the railway feature detecting module, to drive the injection device to automatically move vertically, longitudinally, and laterally relative to the railway to position the injection device over the spike hole before the chemical is injected into the spike hole.

6. A method of operating a railway maintenance machine to fill spike holes in railroad ties of a railway, comprising:

moving a vehicle along a railway, the vehicle having an imaging device and an injection device;

using data from the imaging device, locating a railroad tie;

in response to the locating, automatically stopping the vehicle shuttle cart-over the located railroad tie;

using data from the imaging device, determining the existence and locations of a spike hole in the located railroad tie;

while the vehicle is stopped over the railroad tie, using a controller in communication with the imaging device, automatically moving the injection device in longitudinal and lateral directions relative to the vehicle to overlie the spike hole;

automatically lowering the injection device toward the spike hole; and automatically dispensing a chemical solution into the spike hole to fill the spike hole.

7. The method of claim 6, further comprising, using the controller, detecting and identifying, from captured images from the imaging device, the spike hole when one or more foreign objects is on the railroad tie.

8. The method of claim 6, further comprising, using the controller, detecting and identifying, from captured images from the imaging device, one or more of an imperfection in the railroad tie, a crack in the railroad tie, and foreign objects on the railroad tie.

9. The method of claim 6, wherein a plurality of chemicals are mixed in a mixing tube of the at least one injection device to form the chemical solution.

10. The method of claim 6, wherein the imaging device is a first imaging device and the injection device is a first injection device, and wherein a second imaging device and a second injection device are provided on the shuttle cart, and further comprising:

capturing a first plurality of images of a first railroad tie using the first imaging device;

capturing a second plurality of images of a second railroad tie using the second imaging device;

using a controller in communication with the first and second imaging devices, detecting and identifying, from the captured images, spike holes formed in the first and second railroad ties;

automatically moving the first injection device in longitudinal and lateral directions to overlie the spike hole in the first railroad tie;

automatically moving the second injection device in longitudinal and lateral directions to overlie the at least one spike hole in the second railroad tie;

automatically lowering the first and second injection devices toward the spike holes in the first and second railroad ties; and dispensing a chemical solution into the spike holes to fill the spike holes.

11. The method of claim 6, further comprising:

using the controller, determining, from captured images from the imaging device, whether a railroad tie is present;

if it is determined that a railroad tie is present, automatically stopping the vehicle over the detected railroad tie; and automatically advancing the vehicle along the railway if no railroad tie is detected.

12. The method of claim 6, further comprising, while the vehicle is positioned over a detected railroad tie, detecting and identifying, from captured images from the imaging device, a railroad tie spike hole, and using the controller, determining the location of railroad spike hole.

13. A railroad tie maintenance vehicle for dispensing a chemical into spike holes in a railroad tie of a railway, comprising:

a self-propelled vehicle having a chassis that is movable along the railway and that supports an operator workstation;

an imaging device that faces downwardly towards the railroad tie and that is configured to collect images of the railroad tie;

an injection device that is configured to dispense the chemical solution into the spike holes; and a controller that is coupled to the imaging device, the controller including:

a memory storing a database of images of spike holes;

a detecting module including instructions that, when executed, compare an image captured by the imaging device to the database of images of spike holes to determine the existence and location of a spike hole; and an execution module including instructions that, when executed, automatically controls powered actuators to move the injection device longitudinally, laterally, and vertically relative to the railway to align the injection device with a spike hole and to deposit the chemical into the spike hole.

14. The railroad tie maintenance vehicle of claim 13, further comprising:

a first filler workhead comprising a first hood, a first imaging device, and a first injection device; and a second filler workhead comprising a second hood, a second imaging device, and a second injection device;

wherein the first filler workhead and the second filler workhead are configured to fill spike holes in first and second railroad ties simultaneously.

15. The railroad tie maintenance vehicle of claim 13, wherein the controller determines a lateral distance and longitudinal distance of the detected spike hole relative to the imaging device, and then moves the injection device the lateral distance and longitudinal distance to overlie the detected spike hole.

16. The railroad tie maintenance vehicle of claim 13, further comprising: a first tank containing a first chemical; and a second tank containing a second chemical; wherein the injection device further comprises a mixing tube configured to receive and mix a quantity of the first chemical and a quantity of the second chemical.

17. The railroad tie maintenance vehicle of claim 13, wherein the controller further comprises:

a second execution module including instructions that, when executed, terminate movement of the vehicle when a railroad tie is identified in an image captured by the imaging device, after which the detecting module identifies the existence and location of the spike hole.

18. The railroad maintenance machine of claim 13, wherein the detecting module is configured to detect and determine the location of the railroad tie in which the spike hole is formed before detecting and determining the location of the spike hole, and wherein the execution module includes instructions that, when executed, automatically stop the vehicle in a position in which the spike hole is accessible by the injection device.

19. The railroad maintenance machine of claim 18, wherein the detecting module is configured to, while the vehicle is stopped over the tie, detect and determine the locations of other spike holes in the railroad tie, and wherein the execution module is configured to sequentially automatically position the injection device over the other spike holes and to inject the chemical into the other spike holes.

* * * * *